(12) United States Patent
Lee et al.

(10) Patent No.: US 10,559,840 B2
(45) Date of Patent: Feb. 11, 2020

(54) ION EXCHANGING MEMBRANE, METHOD FOR MANUFACTURING THE SAME AND ENERGY STORAGE SYSTEM COMPRISING THE SAME

(71) Applicant: KOLON INDUSTRIES, INC., Seoul (KR)

(72) Inventors: Eun Su Lee, Yongin-si (KR); Dong Hoon Lee, Yongin-si (KR); Na Young Kim, Yongin-si (KR); Seung Jib Yum, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 0 days.

(21) Appl. No.: 16/097,008

(22) PCT Filed: Feb. 28, 2018

(86) PCT No.: PCT/KR2018/002430
§ 371 (c)(1),
(2) Date: Oct. 26, 2018

(87) PCT Pub. No.: WO2018/199458
PCT Pub. Date: Nov. 1, 2018

(65) Prior Publication Data
US 2019/0363385 A1 Nov. 28, 2019

(30) Foreign Application Priority Data

Apr. 27, 2017 (KR) .................. 10-2017-0054337

(51) Int. Cl.
*H01M 8/00* (2016.01)
*H01M 8/1032* (2016.01)
(Continued)

(52) U.S. Cl.
CPC ......... *H01M 8/1032* (2013.01); *C08J 5/2275* (2013.01); *H01M 8/1027* (2013.01);
(Continued)

(58) Field of Classification Search
CPC ............ H01M 8/1004; H01M 8/1051; H01M 8/1053; H01M 4/86
See application file for complete search history.

(56) References Cited

U.S. PATENT DOCUMENTS

2004/0005474 A1   1/2004 Charnock et al.
2010/0167100 A1   7/2010 Moore et al.
(Continued)

FOREIGN PATENT DOCUMENTS

JP      2002-216797 A    8/2002
KR    10-2011-0120185 A  1/2001
(Continued)

OTHER PUBLICATIONS

Korean Intellectual Property Office, Notice of Decision to Grant Patent for KR 10-2017-0054337 dated Aug. 8, 2018.
(Continued)

*Primary Examiner* — Cynthia H Kelly
*Assistant Examiner* — Monique M Wills
(74) *Attorney, Agent, or Firm* — Sughrue Mion, PLLC

(57) ABSTRACT

The present invention relates to an ion exchanging membrane, a method for manufacturing the same, and an energy storage system comprising the same. The ion exchanging membrane includes a porous support including a plurality of pores, a first ion conducting material located on one surface of the porous support, and a second ion conducting material located on the other surface of the porous support, in which the first ion conducting material and the second ion conducting material are polymers including hydrophilic repeating units and hydrophobic repeating units, and the first ion
(Continued)

conducting material and the second ion conducting material have different molar ratios of the hydrophilic repeating units and the hydrophobic repeating units.

According to the ion exchanging membrane, it is possible to improve overall efficiency of the energy storage system by improving both performance efficiency and voltage efficiency of the energy storage system due to excellent ion-conductivity performance and reduced membrane resistance and ensure durability of the energy storage system by having excellent morphological stability and reducing a crossover of vanadium ions.

15 Claims, 7 Drawing Sheets

(51) Int. Cl.
    *C08J 5/22* (2006.01)
    *H01M 8/1027* (2016.01)
    *H01M 8/1053* (2016.01)
    *H01M 8/1081* (2016.01)
    *H01M 8/18* (2006.01)
    *H01M 8/1018* (2016.01)

(52) U.S. Cl.
    CPC ....... *H01M 8/1053* (2013.01); *H01M 8/1081* (2013.01); *H01M 8/188* (2013.01); *C08J 2387/00* (2013.01); *H01M 2008/1095* (2013.01)

(56) References Cited

U.S. PATENT DOCUMENTS

2016/0236154 A1* 8/2016 Dubois .................. B01D 69/10
2018/0134844 A1* 5/2018 Bae ........................ C08J 5/2262

FOREIGN PATENT DOCUMENTS

| | | |
|---|---|---|
| KR | 10-2005-0045878 A | 5/2005 |
| KR | 10-2006-0083372 A | 7/2006 |
| KR | 10-2011-0006122 A | 1/2011 |
| KR | 10-2012-0021517 A | 3/2012 |
| KR | 10-2012-0060327 A | 6/2012 |
| KR | 10-1214399 B1 | 12/2012 |
| KR | 10-2013-0004615 A | 1/2013 |
| KR | 10-1440829 B1 | 9/2014 |
| KR | 10-1522256 B1 | 5/2015 |
| KR | 10-2015-0118675 A | 10/2015 |
| KR | 10-2016-0038851 A | 4/2016 |
| KR | 10-2016-0059285 A | 5/2016 |
| KR | 10-2017-0038742 A | 4/2017 |
| KR | 10-2017-0079498 A | 7/2017 |
| WO | 2012/019359 A1 | 2/2012 |
| WO | 2014/034415 A1 | 3/2014 |

OTHER PUBLICATIONS

Korean Intellectual Property Office, Office Action for KR 10-2017-0054337 dated Apr. 9, 2018.
Korean Intellectual Property Office, Final Rejection for KR 10-2017-0054337 dated Jul. 16, 2018.
Korean Intellectual Property Office, Decision to Grant Patent for KR 10-2017-0054337 dated Jul. 16, 2018.
International Search Report for PCT/KR2018/002430 dated Jun. 20, 2018.

* cited by examiner

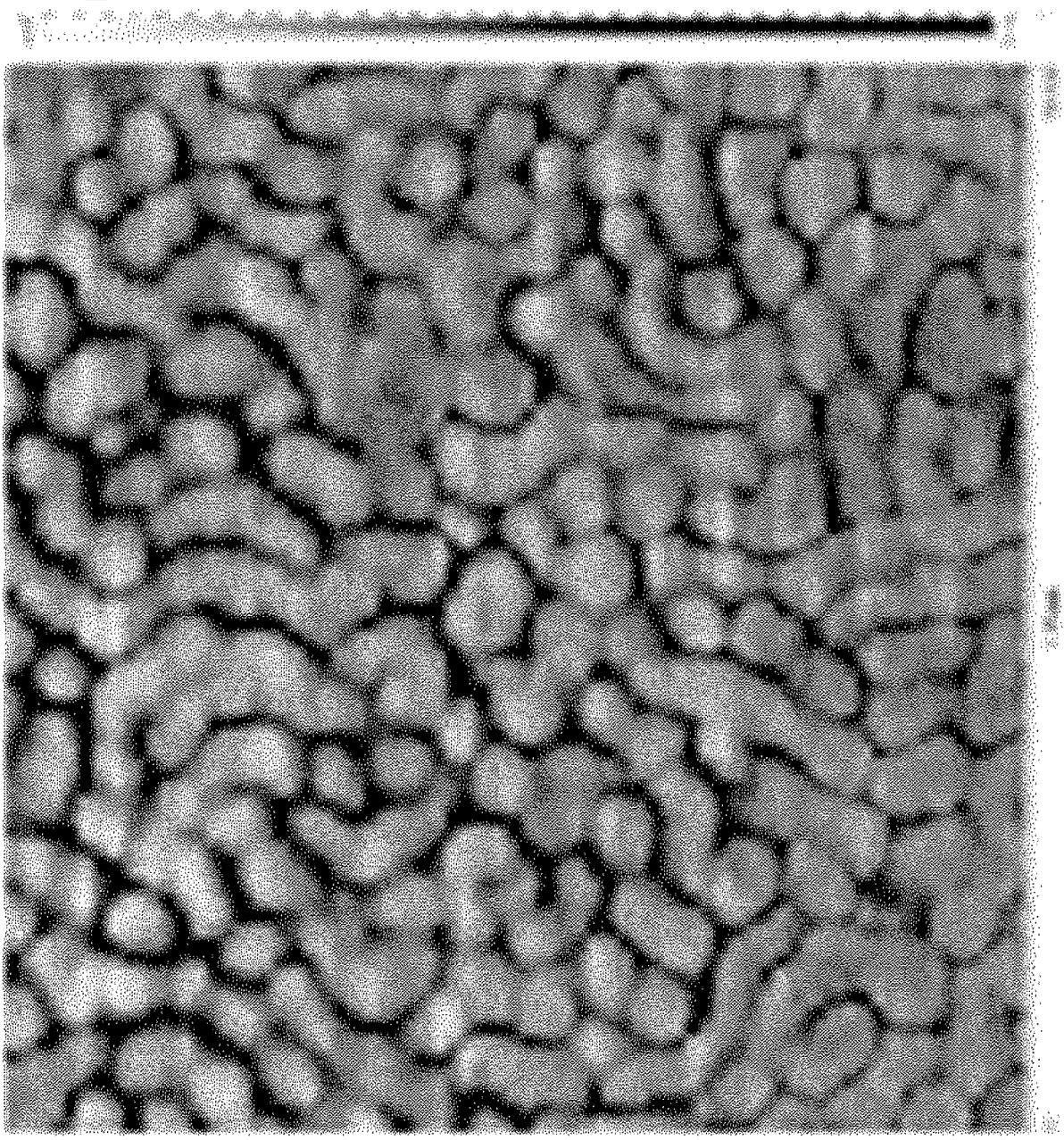

ION EXCHANGING MEMBRANE, METHOD FOR MANUFACTURING THE SAME AND ENERGY STORAGE SYSTEM COMPRISING THE SAME

CROSS REFERENCE TO RELATED APPLICATIONS

This application is a National Stage of International Application No. PCT/KR2018/002430 filed Feb. 28, 2018, claiming priority based on Korean Patent Application No. 10-2017-0054337 filed Apr. 27, 2017.

TECHNICAL FIELD

The present invention relates to an ion exchanging membrane, a method for manufacturing the same, and an energy storage system comprising the same, and more particularly, to an ion exchanging membrane, a method for manufacturing the same, and an energy storage system comprising the same capable of improving overall efficiency of the energy storage system by improving both performance efficiency and voltage efficiency of the energy storage system due to excellent ion-conductivity performance and reduced membrane resistance and ensuring durability of the energy storage system by having excellent morphological stability and reducing a crossover of vanadium ions.

BACKGROUND ART

Efforts are being made to save fossil fuels or to apply renewable energy to more fields by improving the use efficiency to solve the problem of depletion of fossil fuels and environmental pollution.

Renewable energy sources such as solar heat and wind power have been used more efficiently than before, but these energy sources are intermittent and unpredictable. Due to these characteristics, their dependence on these energy sources is limited, and a ratio of renewable energy sources to the current primary power sources is very low.

Since a rechargeable battery provides a simple and efficient method for storing electric power, the rechargeable battery have been miniaturized to increase its mobility, and efforts to utilize the rechargeable battery as power sources for small home appliances such as an intermittent auxiliary power source, a laptop, a tablet PC, and a mobile phone have continued.

Among them, a redox flow battery (RFB) is a secondary battery capable of storing energy for a long time by repeating charging and discharging by an electrochemical reversible reaction of an electrolyte. A stack and an electrolyte tank, which depend on the capacity and output characteristics of the battery, are independent of each other, so that a battery design is free and limitation of an installation space is small.

In addition, the redox flow battery has a load leveling function installed in a power plant, a power system, and a building to cope with an abrupt increase in power demand, a function of compensating or suppressing a power failure or an instantaneous undervoltage, and the like. The redox flow battery is a very powerful storage technology capable of being freely combined if necessary, and a system suitable for large-scale energy storage.

The redox flow battery generally consists of two separated electrolytes. One electrolyte stores an electric active material in an anode reaction and the other electrolyte is used for a cathode reaction. In an actual redox flow battery, the electrolyte reaction is different between the cathode and the anode and there is a flow phenomenon of the electrolyte solution, so that a pressure difference occurs between the cathode side and the anode side. In an all vanadium-based redox flow battery as a representative redox flow battery, reactions of the cathode and anode electrolytes are shown in the following Reaction Formulas 1 and 2, respectively.

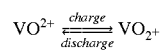  [Reaction Formula 1]

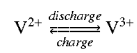  [Reaction Formula 2]

Therefore, in order to overcome the pressure difference between the both electrodes and to exhibit excellent cell performance even if charging and discharging are repeated, an ion exchange membrane having improved physical and chemical durability is required. In the redox flow battery, the ion exchange membrane is a core material accounting for about 10% of the system.

As such, in the redox flow battery, the ion exchange membrane is a main component for determining the lifespan and price of the battery. In order to commercialize the redox flow battery, a low crossover of vanadium ions is required due to high ion selective permeability of the ion exchange membrane, high ion-conductivity is required due to low electrical resistance, and a low price is required in addition to mechanical and chemical stability and high durability.

Meanwhile, currently, polymer electrolyte membranes commercialized as ion exchange membranes have been used for tens of years and have been continuously studied. Recently, as a mediator that transfers ions used in a direct methanol fuel cell (DMFC), a polymer electrolyte membrane fuel cell (proton exchange membrane fuel cell, PEMFC), a redox flow battery, water purification, and the like, many studies on the ion exchange membrane has been actively conducted.

Currently, a widely used material for the ion exchange membrane is a Nafion™-based membrane, which is a perfluorinated sulfonic acid group-containing polymer manufactured by DuPont in USA. At a saturated moisture content, the membrane has ion-conductivity of 0.08 S/cm at room temperature and excellent mechanical strength and chemical resistance and has stable performance as an electrolyte membrane for use in automotive fuel cells. Further, as similar types of commercial membranes, there are an Aciplex-S membrane from Asahi Chemicals, a Dow membrane from Dow Chemicals, a Flemion membrane from Asahi Glass, a GoreSelcet membrane from Gore & Associate, and the like. In the Ballard Power System, Canada, alpha or beta types of perfluorinated polymers have been developed and studied.

However, the membranes have disadvantages of not only having a difficulty in mass production due to a high price and a complicated synthesis method but also greatly lowering efficiency as the ion exchange membrane such as a crossover phenomenon and low ion-conductivity at a high temperature or a low temperature in an electric energy system such as a redox flow battery.

PRIOR ARTS

Patent Document

Korean Patent Publication No. 2006-0083372
Korean Patent Publication No. 2011-0120185

Korean Patent Publication No. 2015-0118675
Korean Patent Registration No. 1522256
Korean Patent Registration No. 1440829
Korean Patent Registration No. 1214399

DISCLOSURE

Technical Problem

An object of the present invention is to provide an ion exchanging membrane capable of improving overall efficiency of an energy storage system by improving both performance efficiency and voltage efficiency of the energy storage system due to excellent ion-conductivity performance and reduced membrane resistance and ensuring durability of the energy storage system by having excellent morphological stability and reducing a crossover of vanadium ions.

Another object of the present invention is to provide a method for manufacturing an ion exchanging membrane capable of manufacturing the ion exchanging membrane having the performance through an existing process and manufacturing the ion exchanging membrane having high efficiency while easily adjusting a thickness ratio required in the energy storage system.

Yet another object of the present invention is to provide an energy storage system including the ion exchanging membrane.

Technical Solution

According to an embodiment of the present invention, there is provided an ion exchanging membrane including a porous support including a plurality of pores, a first ion conducting material located on one surface of the porous support, and a second ion conducting material located on the other surface of the porous support.

The first ion conducting material and the second ion conducting material may be polymers including hydrophilic repeating units and hydrophobic repeating units, and the first ion conducting material and the second ion conducting material may have different molar ratios of the hydrophilic repeating units and the hydrophobic repeating units.

The first ion conducting material and the second ion conducting material may have each independently molar ratios of the hydrophilic repeating units and the hydrophobic repeating units of 1:0.5 to 1:10.

The first ion conducting material may have a molar ratio of the hydrophilic repeating unit to the hydrophobic repeating unit which is higher than the molar ratio of the hydrophilic repeating unit to the hydrophobic repeating unit of the second ion conducting material.

The molar ratio of the hydrophilic repeating unit and the hydrophobic repeating unit in the first ion conducting material may be 1:2 to 1:5, and the molar ratio of the hydrophilic repeating unit and the hydrophobic repeating unit in the second ion conducting material may be 1:3 to 1:6.

A thickness ratio of the first ion conducting material and the second ion conducting material may be 9:1 to 1:9.

The first ion conducting material and the second ion conducting material may each independently be hydrocarbon-based ion conducting materials, and the porous support may be a hydrocarbon-based porous support.

The first ion conducting material and the second ion conducting material may each independently be filled in the pores of the porous support.

The ion exchanging membrane may further include a first ion conducting layer located on one surface of the porous support and a second ion conducting layer located on the other surface of the porous support, in which the first ion conducting layer may include the first ion conducting material, and the second ion conducting layer may include the second ion conducting material.

Thicknesses of the first ion conducting layer and the second ion conducting layer may each independently be 10 to 200 length % with respect to the total thickness of the porous support.

The ion exchanging membrane may include a first ion conducting material filled in pores of the porous support, a first ion conducting layer located on one surface of the porous support, and a second ion conducting layer located on the other surface of the porous support.

A plurality of porous supports including the first ion conducting material and the second ion conducting material may be stacked.

A first ion conducting material or a second ion conducting material of a first porous support may be stacked to face a first ion conducting material or a second ion conducting material of a second porous support.

According to another embodiment of the present invention, there is provided a method for manufacturing an ion exchanging membrane including preparing a porous support including a plurality of pores, forming a first ion conducting material on one surface of the porous support, and forming a second ion conducting material on the other surface of the porous support.

The first ion conducting material and the second ion conducting material may be polymers including hydrophilic repeating units and hydrophobic repeating units, and the first ion conducting material and the second ion conducting material may have different molar ratios of the hydrophilic repeating units and the hydrophobic repeating units.

The method for manufacturing the ion exchanging membrane may further include preparing a plurality of porous supports including the first ion conducting material and the second ion conducting material, and stacking the plurality of porous supports.

According to yet another embodiment of the present invention, there is provided an energy storage system including the ion exchanging membrane.

The energy storage system may be a fuel cell.

The energy storage system may be a redox flow battery.

Advantageous Effects

According to the ion exchanging membrane of the present invention, it is possible to improve overall efficiency of an energy storage system by improving both performance efficiency and voltage efficiency of the energy storage system due to excellent ion-conductivity performance and reduced membrane resistance and ensure durability of the energy storage system by having excellent morphological stability and reducing a crossover of vanadium ions.

According to the method for manufacturing the ion exchanging membrane of the present invention, it is possible to manufacture the ion exchanging membrane having the performance through an existing process and manufacture the ion exchanging membrane having high efficiency while easily adjusting a thickness ratio required in the energy storage system.

DESCRIPTION OF DRAWINGS

FIGS. 6 and 7 are AFM images for one surface and the other surface of an ion exchanging membrane manufactured in Example 1-1 of the present invention.

BEST MODE FOR INVENTION

Figure 1:
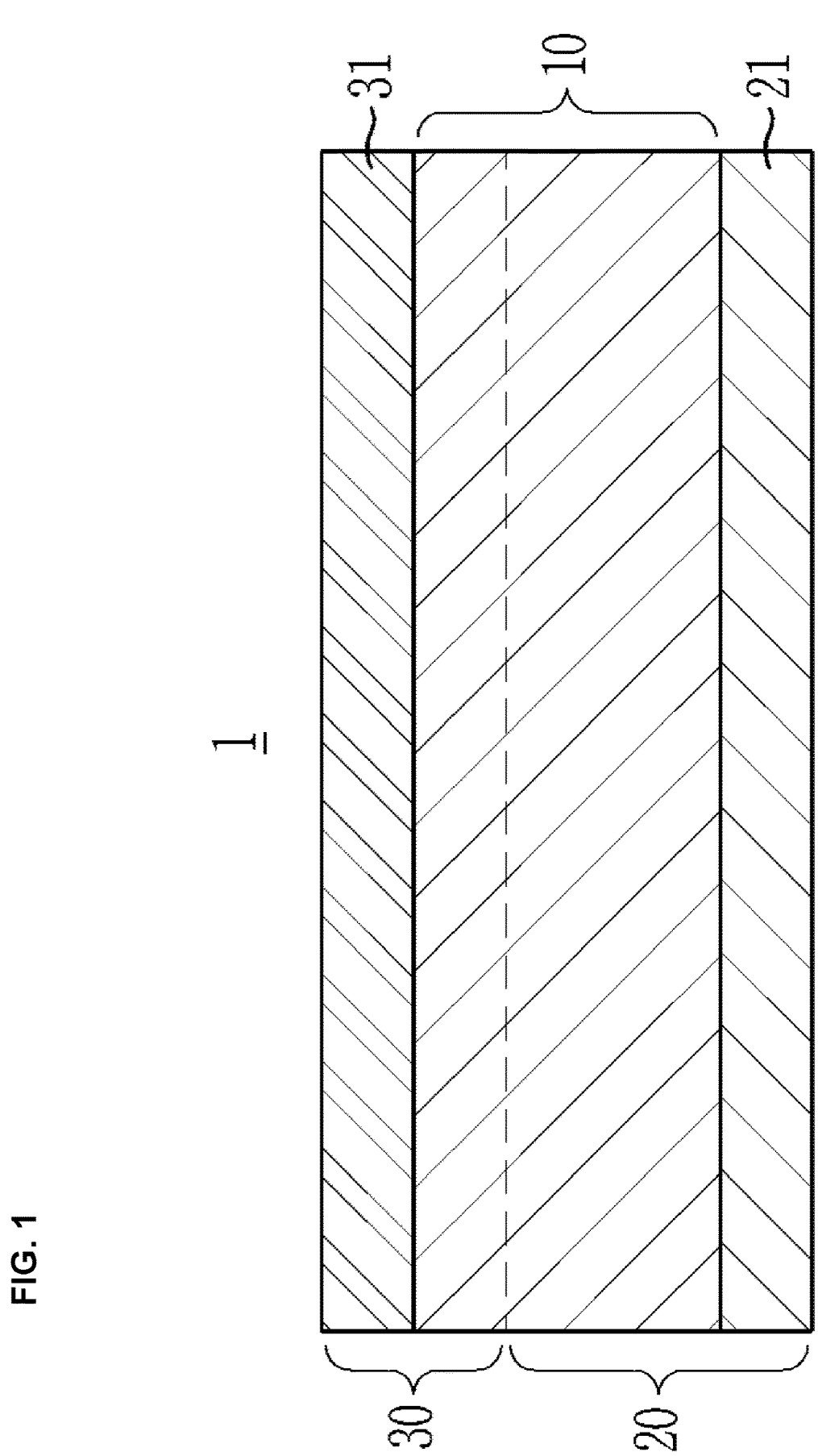
FIG. 1 is a cross-sectional view schematically showing an ion exchanging membrane according to an embodiment of the present invention.

Hereinafter, Examples of the present invention will be described in detail so as to easily implement those skilled in the art. However, the present invention may be embodied in many different forms and are limited to Examples described herein.

Unless otherwise stated in the present specification, an alkyl group includes a primary alkyl group, a secondary alkyl group and a tertiary alkyl group, and refers to a straight or branched chain alkyl group having 1 to 10 carbon atoms, a halogenated alkyl group refers to a straight or branched chain halogenated alkyl group having 1 to 10 carbon atoms, an allyl group refers to an allyl group having 2 to 10 carbon atoms, an aryl group refers to an aryl group having 6 to 30 carbon atoms, an alkoxy group refers to an alkoxy group having 1 to 10 carbon atoms, an alkylsulfonyl group refers to an alkylsulfonyl group having 1 to 10 carbon atoms, an acyl group refers to an acyl group having 1 to 10 carbon atoms, and an aldehyde group refers to an aldehyde group having 1 to 10 carbon atoms.

Unless otherwise stated in the present specification, an amino group includes a primary amino group, a secondary amino group and a tertiary amino group, and the secondary amino group or the tertiary amino group is an amino group having 1 to 10 carbon atoms.

In the present specification, all compounds or substituents may be substituted or unsubstituted unless otherwise stated. Here, the term "substituted" means that hydrogen is replaced with any one selected from the group consisting of a halogen atom, a hydroxyl group, a carboxyl group, a cyano group, a nitro group, an amino group, a thio group, a methyl thio group, an alkoxy group, a nitryl group, an aldehyde group, an epoxy group, an ether group, an ester group, a carbonyl group, an acetal group, a ketone group, an alkyl group, a perfluoroalkyl group, a cycloalkyl group, a heterocycloalkyl group, an allyl group, a benzyl group, an aryl group, a heteroaryl group, derivatives thereof, and combinations thereof.

In the present specification, * represented at both ends of a chemical formula indicates that the chemical formula is linked to another adjacent chemical formula.

In the present specification, an ion conducting material containing a repeating unit represented by one general formula may refer to not only an ion conducting material that includes only a repeating unit represented by one kind of chemical formula included in the general formula, but also an ion conducting material that include repeating units represented by various kinds of chemical formulas included in the general formula.

An ion exchanging membrane according to an embodiment of the present invention includes a porous support having a plurality of pores, and an ion conducting material filled in the pores of the porous support.

The porous support may include a perfluorinated polymer having excellent resistance against thermal and chemical decomposition as an example. For example, the porous support may be a copolymer of polytetrafluoroethylene (PTFE) or tetrafluoroethylene and $CF_2=CFC_nF_{2n+1}$ (n is an integer from 1 to 5) or $CF_2=CFO-(CF_2CF(CF_3)O)_mC_nF_{2n+1}$ (m is an integer of 0 to 15, and n is an integer of 1 to 15).

The PTFE is commercially available and may be suitably used as the porous support. Also, a foamed polytetrafluoroethylene polymer (e-PTFE) having a microstructure of polymeric fibril or a microstructure in which nodes are linked to each other by fibril may be suitably used as the porous support, and a film having a microstructure of polymeric fibril without the nodes may also be suitably used as the porous support.

The porous support including the perfluorinated polymer may be prepared as a porous support which is more porous and stronger by extrusion-molding a dispersion polymerized PTFE onto a tape in the presence of a lubricant and then stretching the material obtained thereby. Further, the amorphous content of the PTFE may be increased by heat-treating the e-PTFE at a temperature exceeding the melting point (about 342° C.) of the PTFE. The e-PTFE film prepared by the above method may have micropores having various diameters and a porosity. The e-PTFE film prepared by the above method may have at least 35% of pores, and the diameter of the micropore may be about 0.01 to 1 μm. In addition, the thickness of the porous support including the perfluorinated polymer may be variously changed, but may be, for example, 2 μm to 40 μm, preferably 5 μm to 20 μm. If the thickness of the porous support is less than 2 μm, the mechanical strength may be significantly lowered, whereas if the thickness of the porous support is more than 40 μm, the resistance loss may increase, and the light weight and integration may be lowered.

As another example of the porous support, the porous support may be a nonwoven fibrous web formed of a plurality of fibers which are randomly oriented.

The nonwoven fibrous web is interlaid, but refers to a sheet having a structure of individual fibers or filaments instead of the same manner as a woven fabric. The nonwoven fibrous web may be prepared by any one method selected from the group consisting of carding, garneting, air-laying, wet-laying, melt blowing, spunbonding, and stitch bonding.

The fiber may include one or higher polymeric materials, and generally, any material used as fiber-forming polymeric materials may be used, and specifically, hydrocarbon-based fiber-forming polymeric materials may be used. For example, the fiber-forming polymeric material may include any one selected from the group consisting of polyolefins such as polybutylene, polypropylene and polyethylene; polyesters such as polyethylene terephthalate and polybutylene terephthalate; polyamides (nylon-6 and nylon-6,6); polyurethane; polybutene; polylactic acid; polyvinyl alcohol; polyphenylene sulfide; polysulfone; a fluid crystalline polymer; polyethylene-co-vinyl acetate; polyacrylonitrile; cyclic polyolefin; polyoxymethylene; a polyolefinic thermoplastic elastomer; and combinations thereof, but the present invention is not limited thereto.

As yet another example of the porous support in the form of the nonwoven fibrous web, the porous support may include a nanoweb in which the nanofibers are integrated in a nonwoven fabric form including a plurality of pores.

The nanofibers may use preferably hydrocarbon-based polymers which exhibit excellent chemical resistance and have no fear of a morphological change by moisture in a high humid environment due to hydrophobicity. Specifically, the hydrocarbon-based polymer may use any one selected from the group consisting of nylon, polyimide, polyaramid, polyetherimide, polyacrylonitrile, polyaniline, polyethylene oxide, polyethylene naphthalate, polybutylene terephthalate, styrene butadiene rubber, polystyrene, polyvinyl chloride, polyvinyl alcohol, polyvinylidene fluoride, polyvinyl butylene, polyurethane, polybenzoxazole, polybenzimidazole, polyamideimide, polyethylene terephthalate, polyphenylene sulfide, polyethylene, polypropylene, copolymers thereof, and mixtures thereof, and among them, polyimide having superior heat resistance, chemical resistance, and morphological stability may be preferably used.

The nanoweb is an aggregate of nanofibers in which nanofibers prepared by electrospinning are randomly arranged. At this time, in consideration of the porosity and the thickness of the nanoweb, it is preferable that the nanofiber has an average diameter of 40 to 5000 nm when diameters of 50 fibers are measured by using a scanning electron microscope (JSM6700F, JEOL) and calculated from an average thereof. If the average diameter of the nanofibers is less than 40 nm, the mechanical strength of the porous support may be lowered, and if the average diameter of the nanofibers is more than 5,000 nm, the porosity may be significantly decreased and the thickness may be increased.

The thickness of the nonwoven fibrous web may be 10 to 50 μm, and specifically 15 to 43 μm. If the thickness of the nonwoven fibrous web is less than 10 μm, the mechanical strength may be lowered, and if the thickness of the nonwoven fibrous web is more than 50 μm, the resistance loss may increase, and the light weight and integration may be lowered.

The basic weight of the nonwoven fibrous web may be 5 to 30 $g/m^2$. If the basic weight of the nonwoven fibrous web is less than 5 $g/m^2$, it may be difficult to function as a porous support due to the formation of visible pores, and if the basic weight is more than 30 $g/m^2$, the porous support may be manufactured in the form of paper or a fabric in which pores are almost not formed.

The porosity of the porous support may be 45% or higher and specifically 60% or higher. Meanwhile, the porous support preferably has a porosity of 90% or less. If the porosity of the porous support is more than 90%, the morphological stability may be lowered so that the post-treatment may not proceed smoothly. The porosity may be calculated by a ratio of the volume of air to the total volume of the porous support according to the following Equation 1. At this time, the total volume is calculated by manufacturing a rectangular sample and measuring the width, length, and thickness of the rectangular sample, and the air volume may be obtained by subtracting the volume of the polymer inversely calculated from the density after measuring the mass of the sample from the total volume.

Porosity (%)=(air volume in porous support/total volume of porous support)×100 [Equation 1]

The ion exchanging membrane is an ion exchanging membrane in the form of a reinforced composite membrane in which the ion conducting material is filled in the pores of the porous support.

The ion conducting material may be a cation conducting material having a cation exchange group such as a proton, or an anion conducting material having an anion exchange group such as hydroxyl ions, carbonate or bicarbonate.

The cation exchange group may be any one selected from the group consisting of a sulfonic acid group, a carboxyl group, a boronic acid group, a phosphoric acid group, an imide group, a sulfonimide group, a sulfonamide group and combinations thereof, and may be generally a sulfonic acid group or a carboxyl group.

The cation conducting material includes the cation exchange group, and may include fluorine-based polymers containing fluorine in a main chain; hydrocarbon-based polymers such as benzimidazole, polyimide, polyamideimide, polyimide, polyacetal, polyethylene, polypropylene, an acrylic resin, polyester, polysulfone, polyether, polyetherimide, polyethersulfone, polycarbonate, polystylene, polyphenylene sulfide, polyetherether ketone, polyether ketone, polyaryl ether sulfone, polyphosphazene or polyphenylquinoxaline; partially fluorinated polymers such as a polystyrene-graft-ethylene tetrafluoroethylene copolymer, or a polystyrene-graft-polytetrafluoroethylene copolymer; sulfonimide, and the like.

More specifically, when the cation conducting material is a hydrogen-ion cation conducting material, the polymers may include a cation exchange group selected from the group consisting of a sulfonic acid group, a carboxylic acid group, a phosphoric acid group, a phosphonic acid group and derivatives thereof in a side chain. Specific examples of the cation conducting material may include fluorine-based polymers including poly(perfluorosulfonic acid), poly(perfluorocarboxylic acid), a copolymer of tetrafluoroethylene and fluorovinyl ether containing sulfonic acid groups, defluorinated sulfated polyether ketone or mixtures thereof; and hydrocarbon-based polymers sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene and mixtures thereof, but the present invention is not limited thereto.

The anion conducting material is a polymer capable of transferring anions such as hydroxyl ions, carbonate, or bicarbonate, the anion conducting material is commercially available in the form of hydroxide or halide (generally, chloride), and the anion conducting material may be used in industrial water purification, metal separation, a catalytic process, or the like.

As the anion conducting material, a polymer doped with metal hydroxide may be generally used. Specifically, the polymer doped with metal hydroxide may use poly (ether sulfone), polystyrene, a vinyl-based polymer, poly(vinyl chloride), poly(vinylidene fluoride), poly(tetrafluoroethylene), poly(benzimidazole), poly(ethylene glycol), or the like.

Meanwhile, the ion exchanging membrane includes a first ion conducting material located on one surface of the porous support and a second ion conducting material located on the other surface of the porous support.

Here, the first ion conducting material and the second ion conducting material are polymers including hydrophilic repeating units and hydrophobic repeating units, and the first ion conducting material and the second ion conducting material may have different molar ratios of the hydrophilic repeating units to the hydrophobic repeating units.

At least one monomer constituting the hydrophilic repeating unit is substituted with the ion exchange group and a monomer constituting the hydrophobic repeating unit may not be substituted with the ion exchange group or may be substituted with a smaller number of ion exchange groups than those of the hydrophilic repeating unit. In addition, although all the monomers constituting the hydrophilic repeating unit may also include the ion exchange group, the hydrophilic repeating unit may be constituted by the monomer substituted with the ion exchange group and the monomer not substituted with the ion exchange group.

The first ion conducting material and the second ion conducting material may be random copolymers in which the hydrophilic repeating unit and the hydrophobic repeating unit are randomly linked to each other or block copolymers including hydrophobic blocks consisting of the hydrophilic repeating units and hydrophobic blocks consisting of the hydrophobic repeating units.

More specifically, the first ion conducting material and the second ion conducting material may each independently be a hydrophilic repeating unit including a monomer represented by the following Chemical Formula 2.

[Chemical Formula 2]

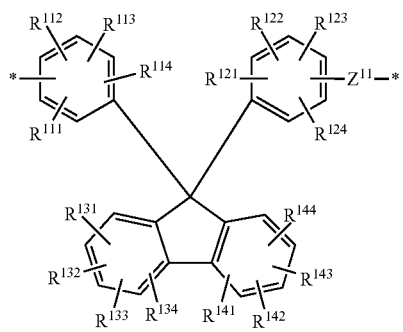

In Chemical Formula 2 above, the $R^{111}$ to $R^{114}$, $R^{121}$ to $R^{124}$, $R^{131}$ to $R^{134}$, and $R^{141}$ to $R^{144}$ may each independently be any one selected from the group consisting of a hydrogen atom, a halogen atom, an ion exchange group (ion conducting group), an electron donation group, and an electron withdrawing group.

The halogen atom may be any one selected from the group consisting of bromine, fluorine, and chlorine.

The ion exchange group may be any one cation exchange group selected from the group consisting of a sulfonic acid group, a carboxylic acid group, and a phosphoric acid group, and the cation exchange group may be preferably a sulfonic acid group. The ion exchange group may be an anion exchange group such as an amine group.

In addition, the electron donation group may be any one selected from the group consisting of an alkyl group, an allyl group, an aryl group, an amino group, a hydroxyl group, and an alkoxy group as an organic group for releasing electrons, and the electron withdrawing group may be any one selected from the group consisting of an alkylsulfonyl group, an acyl group, a halogenated alkyl group, an aldehyde group, a nitro group, a nitroso group and a nitrile group as an organic group for attracting electrons.

The alkyl group may be a methyl group, an ethyl group, a propyl group, a butyl group, an isobutyl group, an amyl group, a hexyl group, a cyclohexyl group, an octyl group, or the like, and the halogenated alkyl group may be a trifluoromethyl group, a pentafluoroethyl group, a perfluoroethyl group, a perfluoropropyl group, a perfluorobutyl group, a perfluoropentyl group, a perfluorohexyl group, or the like, and the allyl group may be a prophenyl group or the like, and the aryl group may be a phenyl group, a pentafluorophenyl group, or the like. The perfluoroalkyl group refers to an alkyl group in which some of hydrogen atoms or all of hydrogen atoms are substituted with fluorine.

The $Z^{11}$ is a divalent organic group, which may be —O— or —S—, and preferably —O—.

At this time, in order for the repeating unit including the monomer represented by Chemical Formula 2 above to become the hydrophilic repeating unit, in the monomer represented by Chemical Formula 2 above, at least one of the $R^{111}$ to $R^{114}$, $R^{121}$ to $R^{124}$, $R^{131}$ to $R^{134}$, and $R^{141}$ to $R^{144}$ may be the ion exchange group.

Specifically, the hydrophilic repeating unit may be represented by the following Chemical Formula 2-1 or 2-2.

[Chemical Formula 2-1]

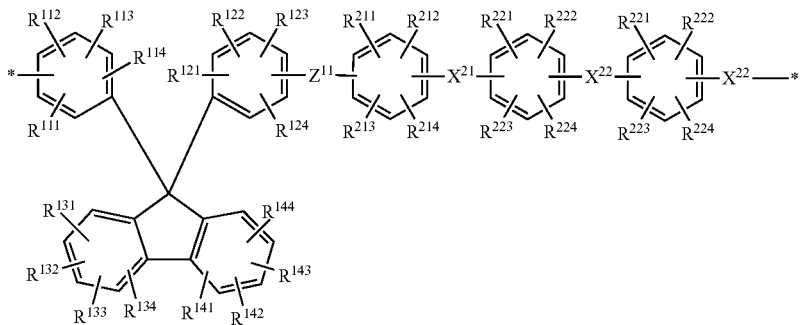

In Chemical Formula 2-1 above, since the detailed description for the $R^{111}$ to $R^{114}$, $R^{121}$ to $R^{124}$, $R^{131}$ to $R^{134}$, $R^{141}$ to $R^{144}$, and $Z^{11}$ is the same as described above, a repeated description will be omitted.

The $R^{211}$ to $R^{214}$, $R^{221}$ to $R^{224}$, and $R^{231}$ to $R^{234}$ may each independently be any one selected from the group consisting of a hydrogen atom; a halogen atom; an electron donation group selected from the group consisting of an alkyl group, an allyl group, an aryl group, an amino group, a hydroxyl group, and an alkoxy group; and an electron withdrawing group selected from the group consisting of an alkylsulfonyl group, an acyl group, a halogenated alkyl group, an aldehyde group, a nitro group, a nitroso group and a nitrile group. Since the detailed description of the substituents is the same as the above, a repeated description will be omitted.

The $X^{21}$ and $X^{22}$ may each independently be a single bond or a divalent organic group. The bivalent organic group is a bivalent organic group which attracts electrons or releases electrons, and specifically, may be any one selected from the group consisting of —CO—, —SO$_2$—, —CONH—, —COO—, —CR'$_2$—, —C(CH$_3$)$_2$—, —C(CF$_3$)$_2$—, and —(CH$_2$)$_n$—. At this time, the R' is any one selected from the group consisting of a hydrogen atom, a halogen atom, an alkyl group, and a halogenated alkyl group, and the n may be an integer of 1 to 10. When the $X^{21}$ or $X^{22}$ is a single bond, it is meant that phenyl groups existing on both sides of the X are directly linked, and as a representative example thereof, a biphenyl group may be included.

The $Z^{21}$ is a divalent organic group, which may be —O— or —S—, and preferably —O—.

[Chemical Formula 2-2]

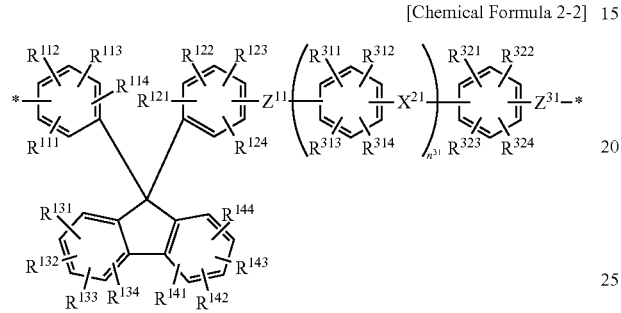

In Chemical Formula 2-2 above, since the detailed description for the $R^{111}$ to $R^{114}$, $R^{121}$ to $R^{124}$, $R^{131}$ to $R^{134}$, $R^{141}$ to $R^{144}$, and $Z^{11}$ is the same as described above, a repeated description will be omitted.

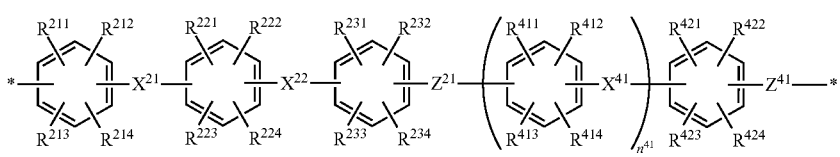

The $R^{311}$ to $R^{314}$, and $R^{321}$ to $R^{324}$ may each independently be any one selected from the group consisting of a hydrogen atom; a halogen atom; an ion exchange group (ion conducting group); an electron donation group selected from the group consisting of an alkyl group, an allyl group, an aryl group, an amino group, a hydroxyl group, and an alkoxy group; and an electron withdrawing group selected from the group consisting of an alkylsulfonyl group, an acyl group, a halogenated alkyl group, an aldehyde group, a nitro group, a nitroso group and a nitrile group. Since the detailed description of the substituents is the same as the above, a repeated description will be omitted.

The $X^{31}$ may be any one bivalent organic group selected from the group consisting of a single bond, —CO—, —SO$_2$—, —CONH—, —COO—, —CR'$_2$—, —(CH$_2$)$_n$—, a cyclohexylidene group, a cyclohexylidene group containing an ion exchange group, a fluorenylidene group, a fluorenylidene group containing an ion exchange group, —C(CH$_3$)$_2$—, —C(CF$_3$)$_2$—, —O— and —S—, the R' may be any one selected from the group consisting of a hydrogen atom, a halogen atom, an alkyl group, and a halogenated alkyl group, and the n may be an integer of 1 to 10. Since the detailed description of the substituents is the same as the above, a repeated description will be omitted.

However, the cyclohexylidene group containing the ion exchange group or the fluorenylidene group containing the ion exchange group means that hydrogen of the cyclohexylidene group or the fluorenylidene group is substituted with any one ion exchange group selected from the group consisting of a sulfonic acid group, a carboxyl group, a phosphoric acid group, and combinations thereof.

The $Z^{31}$ is a divalent organic group, which may be —O— or —S—, and preferably —O—.

The $n^{31}$ may be an integer of 0 to 10 and preferably an integer of 0 or 1.

Meanwhile, the first ion conducting material and the second ion conducting material may each independently have a hydrophobic repeating unit including a monomer represented by the following Chemical Formula 3.

[Chemical Formula 3]

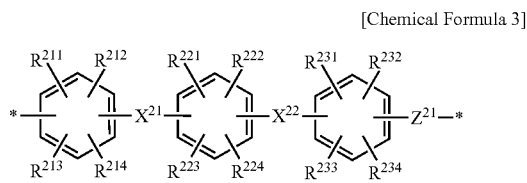

In Chemical Formula 3 above, since the detailed description for the $R^{211}$ to $R^{214}$, $R^{221}$ to $R^{224}$, $R^{231}$ to $R^{234}$, $X^{21}$, $X^{22}$, and $Z^{21}$ is the same as described above, a repeated description will be omitted.

Specifically, the hydrophobic repeating unit may be represented by the following Chemical Formula 3-1.

[Chemical Formula 3-1]

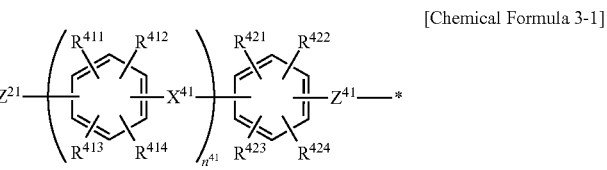

In Chemical Formula 3-1 above, since the detailed description for the $R^{211}$ to $R^{214}$, $R^{211}$ to $R^{224}$, $R^{231}$ to $R^{234}$, $X^{21}$, $X^{22}$, and $Z^{21}$ is the same as described above, a repeated description will be omitted.

The $R^{411}$ to $R^{414}$, and $R^{421}$ to $R^{424}$ may each independently be any one selected from the group consisting of a hydrogen atom; a halogen atom; an electron donation group selected from the group consisting of an alkyl group, an allyl group, an aryl group, an amino group, a hydroxyl group, and an alkoxy group; and an electron withdrawing group selected from the group consisting of an alkylsulfonyl group, an acyl group, a halogenated alkyl group, an aldehyde group, a nitro group, a nitroso group and a nitrile group. Since the detailed description of the substituents is the same as the above, a repeated description will be omitted.

The $X^{41}$ may be any one bivalent organic group selected from the group consisting of a single bond, —CO—, —SO$_2$—, —CONH—, —COO—, —CR'$_2$—, —(CH$_2$)$_n$—, a cyclohexylidene group, a fluorenylidene group, —C(CH$_3$)$_2$—, —C(CF$_3$)$_2$—, —O— and —S—, the R' may be any one selected from the group consisting of a hydrogen atom, a halogen atom, an alkyl group, and a halogenated alkyl group, and the n may be an integer of 1 to 10. Since the detailed description of the substituents is the same as the above, a repeated description will be omitted.

The $Z^{41}$ is a divalent organic group, which may be —O— or —S—, and preferably —O—.

The $n^{41}$ may be an integer of 0 to 10 and preferably an integer of 0 or 1.

In addition, the first ion conducting material and the second ion conducting material may each independently have the hydrophobic repeating unit including a monomer represented by the following Chemical Formula 4.

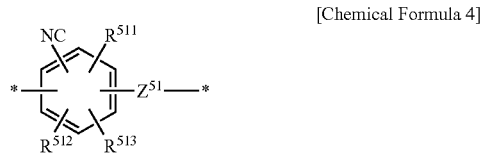

[Chemical Formula 4]

In Chemical Formula 4 above, the $R^{511}$ to $R^{513}$ may each independently be any one selected from the group consisting of a hydrogen atom; a halogen atom; an electron donation group selected from the group consisting of an alkyl group, an allyl group, an aryl group, an amino group, a hydroxyl group, and an alkoxy group; and an electron withdrawing group selected from the group consisting of an alkylsulfonyl group, an acyl group, a halogenated alkyl group, an aldehyde group, a nitro group, a nitroso group and a nitrile group. Since the detailed description of the substituents is the same as the above, a repeated description will be omitted.

The $Z^{51}$ is a divalent organic group, which may be —O— or —S—, and preferably —O—.

Specifically, the hydrophobic repeating unit may be represented by the following Chemical Formula 4-1.

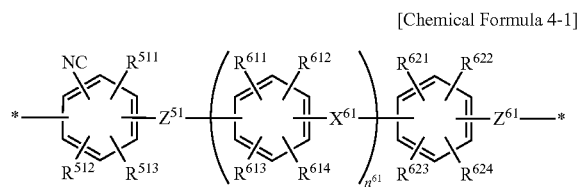

[Chemical Formula 4-1]

In Chemical Formula 4-1 above, since the detailed description of the $R^{511}$ to $R^{513}$, and $Z^{51}$ is the same as described above, a repeated description will be omitted.

The $R^{611}$ to $R^{614}$, and $R^{621}$ to $R^{624}$ may each independently be any one selected from the group consisting of a hydrogen atom; a halogen atom; an electron donation group selected from the group consisting of an alkyl group, an allyl group, an aryl group, an amino group, a hydroxyl group, and an alkoxy group; and an electron withdrawing group selected from the group consisting of an alkylsulfonyl group, an acyl group, a halogenated alkyl group, an aldehyde group, a nitro group, a nitroso group and a nitrile group. Since the detailed description of the substituents is the same as the above, a repeated description will be omitted.

The $X^{61}$ may be any one bivalent organic group selected from the group consisting of a single bond, —CO—, —$SO_2$—, —CONH—, —COO—, —$CR'_2$—, —$(CH_2)_n$—, a cyclohexylidene group, a fluorenylidene group, —$C(CH_3)_2$—, —$C(CF_3)_2$—, —O— and —S—, the R' may be any one selected from the group consisting of a hydrogen atom, a halogen atom, an alkyl group, and a halogenated alkyl group, and the n may be an integer of 1 to 10. Since the detailed description of the substituents is the same as the above, a repeated description will be omitted.

The $Z^{61}$ is each independently a divalent organic group, which may be —O— or —S—, and preferably —O—.

The $n^{61}$ may be an integer of 0 to 10 and preferably an integer of 0 or 1.

Meanwhile, the first ion conducting material and the second ion conducting material may each independently have the hydrophobic repeating unit represented by the following Chemical Formula 5-1.

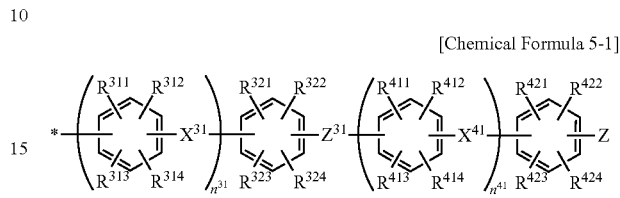

[Chemical Formula 5-1]

In Chemical Formula 5-1 above, since the detailed description for the $R^{311}$ to $R^{314}$, $R^{321}$ to $R^{324}$, $R^{411}$ to $R^{414}$, $R^{421}$ to $R^{424}$, $X^{31}$, $X^{41}$, $Z^{31}$, $Z^{41}$, $n^{31}$, and $n^{41}$ is the same as described above, a repeated description will be omitted. However, at this time, the $X^{31}$ and the $X^{41}$ may be different from each other.

In order for the repeating units represented by Chemical Formulas 3-1, 4-1, and 5-1 above to become a hydrophobic repeating unit, in the repeating units represented by Chemical Formulas 3-1, 4-1, and 5-1 above, it is preferable that the $R^{211}$ to $R^{214}$, $R^{221}$ to $R^{224}$, $R^{231}$ to $R^{234}$, $R^{311}$ to $R^{314}$, $R^{321}$ to $R^{324}$, $R^{411}$ to $R^{414}$, $R^{421}$ to $R^{424}$, $R^{511}$ to $R^{513}$, $R^{611}$ to $R^{614}$, and $R^{621}$ to $R^{624}$ do not substantially include the ion exchange groups. Here, a meaning of not substantially including the ion exchange groups means that the substituents may also include a small amount of ion exchange group, but the amount thereof is enough not to interfere with a phase separation between the hydrophilic region and the hydrophobic region.

Meanwhile, the first ion conducting material and the second ion conducting material may each independently have the hydrophilic repeating unit or the hydrophobic repeating unit further including a monomer represented by the following Chemical Formula 6.

When the first ion conducting material or the second ion conducting material further includes a monomer represented by Chemical Formula 6 above, the first ion conducting material or the second ion conducting material includes a nitrogen-containing aromatic ring group in a main chain to improve durability against radical attacks and interaction between acid and base. Accordingly, in the first ion conducting material or the second ion conducting material, an addition reaction does not occur in the aromatic ring of the ion exchanging membrane or a breakage of the aromatic ring does not occur due to the attack of the radicals formed on the cathode side during the operation of a fuel cell, and the function of the ion exchange group is maximized, thereby improving operation performance of the fuel cell in a low humid state.

[Chemical Formula 6]

In Chemical Formula 6 above, the Z may be —O— or —S— and preferably —O—.

The Y is a bivalent nitrogen-containing aromatic ring group. The nitrogen-containing aromatic ring group means that at least one nitrogen atom is contained as a hetero atom in the aromatic ring. In addition to the nitrogen atom, another hetero atom may include an oxygen atom, a sulfur atom, and the like.

Specifically, the divalent nitrogen-containing aromatic ring group may be a divalent group of any one nitrogen-containing aromatic ring compound selected from the group consisting of pyrrole, thiazole, isothiazole, oxazole, isoxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine and indoline.

The first ion conducting material and the second ion conducting material may have a weight average molecular weight of 10,000 g/mol to 1,000,000 g/mol, and preferably a weight average molecular weight of 100,000 g/mol to 500,000 g/mol. When the weight average molecular weights of the first ion conducting material and the second ion conducting material are less than 100,000 g/mol, it is difficult to form a uniform membrane and the durability may be deteriorated. When the weight average molecular weights of the first ion conducting material and the second ion conducting material are more than 500,000 g/mol, the solubility may be reduced.

When the first ion conducting material and the second ion conducting material are hydrocarbon-based copolymers consisting of the hydrophilic repeating units and the hydrophobic repeating units as described above, it is preferable that the porous support uses a hydrocarbon-based porous support in terms of the stability of the ion exchanging membrane. Specifically, when combining a porous support and an ion conducting material having different properties, for example, a fluorine-based porous support and a hydrocarbon-based ion conducting material, the ion conducting material may easily be separated or discharged from the porous support, or the impregnability may be deteriorated.

The first ion conducting material and the second ion conducting material may be prepared by preparing the hydrophilic repeating units and the hydrophobic repeating units, respectively, and then performing a nucleophilic substitution reaction of the hydrophilic repeating units and the hydrophobic repeating units.

Also, the hydrophilic repeating unit and the hydrophobic repeating unit may be prepared by the nucleophilic substitution reaction. For example, when the hydrophilic repeating unit is the repeating unit represented by Chemical Formula 2-2 above, the hydrophilic repeating unit may be prepared by an aromatic nucleophilic substitution reaction of an active dihalide monomer and a dihydroxide monomer of two components constituting the repeating unit represented by Chemical Formula 2-2 above. In addition, when the hydrophobic repeating unit is the repeating unit represented by Chemical Formula 3-1 above, the hydrophobic repeating unit may be prepared by an aromatic nucleophilic substitution reaction of an active dihalide monomer and a dihydroxide monomer of two components constituting the repeating unit represented by Chemical Formula 3-1 above.

For example, when the hydrophilic repeating unit is the repeating unit represented by Chemical Formula 2-2 above, the hydrophilic repeating unit may be prepared by a nucleophilic substitution reaction of the active dihalide monomer such as sulfonated dichlorodiphenyl sulfone (SDCDPS), sulfonated difluorodiphenyl sulfone (SDFDPS), sulfonated dichlorodiphenyl ketone (SDCDPK), dichlorodiphenyl sulfone (DCDPS), difluorodiphenyl sulfone or bis-(4-fluorophenyl)-sulfone (DFDPS) or dichlorodiphenyl ketone (DCDPK) and the active dihydroxide monomer such as sulfonated 9,9'-bis(4-hydroxyphenyl)fluorine or sulfonated 4,4'-(9-fluorenylidene biphenol) (SHPF) or 9,9'-bis(4-hydroxyphenyl)fluorine or 4,4'-(9-fluorenylidene biphenol) (HPF).

When the hydrophobic repeating unit is the repeating unit represented by Chemical Formula 3-1 above, the hydrophobic repeating unit may be prepared by a nucleophilic substitution reaction of the active dihalide monomer such as 1,3-bis(4-fluorobenzoyl)benzene and the active dihydroxide monomer such as dihydroxydiphenyl sulfone (DHDPS), dihydroxydiphenyl ketone or dihydroxybenzophenone (DHDPK), or 4,4'-biphenol (BP).

When the hydrophobic repeating unit is the repeating unit represented by Chemical Formula 4-1 above, the hydrophobic repeating unit may be prepared by a nucleophilic substitution reaction of the active dihalide monomer such as 2,6-difluorobenzonitrile and the active dihydroxide monomer such as dihydroxydiphenyl sulfone (DHDPS), dihydroxydiphenyl ketone or dihydroxybenzophenone (DHDPK), or 4,4'-biphenol (BP).

Similarly, even when the prepared hydrophilic repeating unit and the hydrophobic repeating unit are subjected to the nucleophilic substitution reaction, both ends of the hydrophilic repeating unit are adjusted to hydroxyl groups and both ends of the hydrophobic repeating unit are adjusted to halide groups, or both ends of the hydrophobic repeating unit are adjusted to hydroxyl groups and both ends of the hydrophilic repeating unit are adjusted to halide groups, so that the hydrophilic repeating unit and the hydrophobic repeating unit may be subjected to the nucleophilic substitution reaction.

At this time, the nucleophilic substitution reaction may be preferably performed in the presence of an alkaline compound. The alkaline compound may be specifically, sodium hydroxide, potassium hydroxide, sodium carbonate, potassium carbonate, sodium hydrogen carbonate, or the like, and may be used alone or in combination of two or more thereof.

In addition, the nucleophilic substitution reaction may be performed in a solvent. At this time, the solvent may include specifically, a nonprotonic polar solvent such as N,N-dimethylacetamide, N,N-dimethyl formamide, N-methyl-2-pyrrolidone, dimethyl sulfoxide, sulfolane, 1,3-dimethyl-2-imidazolidinone, or the like, and may be used alone or in combination of two or more thereof.

At this time, in addition to the nonprotonic polar solvent, a solvent such as benzene, toluene, xylene, hexane, cyclohexane, octane, chloro benzene, dioxane, tetrahydrofuran, anisole, phenetole and the like may coexist.

Optionally, the method may further include introducing the ion exchange group into the first ion conducting material and the second ion conducting material. For example, when the ion exchange group is a sulfonic acid group, which is a cation exchange group, as the introducing of the ion exchange group into the ion conducting material, two methods below may be exemplified.

First, when preparing the hydrophilic repeating units of the first ion conducting material and the second ion conducting material, there is a method of introducing the ion exchange group into the polymer prepared by polymerization using the monomer containing the ion exchange group. In this case, as the monomer for the nucleophilic substitution reaction, sulfonated dichlorodiphenyl sulfone (SDCDPS), sulfonated difluorodiphenyl sulfone (SDFDPS), sulfonated dichlorodiphenyl ketone (SDCDPK), or sulfonated 9,9'-bis (4-hydroxyphenyl)fluorine or sulfonated 4,4'-(9-Fluorenylidene biphenol) (SHPF) including the ion exchange group may be used.

In this case, a method of preparing the polymer having the sulfonic acid ester group by reacting with a monomer having a sulfonic acid ester group instead of the sulfonic acid group, and then converting the sulfonic acid ester group into a sulfonic acid group may also be used.

Second, an ion exchange group may be introduced into the hydrophilic repeating unit by preparing a polymer using the monomer not containing the ion exchange group and sulfonating the polymer using a sulfonating agent.

As the sulfonating agent, sulfuric acid may be used, but in another example, the prepared polymer is reacted in a chlorinated solvent such as dichloromethane, chloroform, and 1,2-dichloroethane in the presence of a large amount of chlorosulfonic acid (1 to 10 times, preferably 4 to 7 times, based on the total weight of the polymer) to prepare an ion conducting material having hydrogen ion-conductivity.

When the first ion conducting material and the second ion conducting material include a sulfonic acid group as the ion exchange group, the ion conducting material may have a degree of sulfonation of 1 to 100 mol %, preferably 50 to 100 mol %. That is, the ion conducting material may be 100 mol % sulfonated at a site that may be sulfonated, and even if the ion conducting material is 100 mol % sulfonated, the dimensional stability and the durability of the ion conducting material are not deteriorated due to the structure of the block copolymer of the ion conducting material. In addition, when the ion conducting material has the degree of sulfonation in the range described above, excellent ion-conductivity may be exhibited without deteriorating the dimensional stability.

When the first ion conducting material and the second ion conducting material include the hydrophilic repeating unit and the hydrophobic repeating unit, the hydrophilic repeating unit and the hydrophobic repeating unit are first synthesized in an oligomer state and then the hydrophobic repeating unit and the hydrophobic repeating unit are synthesized to have a desired molar ratio so that the structure may be easily controlled and the characteristics as the ion conducting material may be easily controlled. The structure-controlled ion conducting material may provide an ion conducting material having improved ion-conductivity and durability within the entire humidification range due to the fine phase separation of the hydrophilic repeating unit and the hydrophobic repeating unit.

At the time, the molar ratio of the hydrophilic repeating unit and the hydrophobic repeating unit means the number of moles of the hydrophobic repeating unit per 1 mole of the hydrophilic repeating unit contained in the first ion conducting material or the second ion conducting material. The first ion conducting material and the second ion conducting material may each independently have a molar ratio of the hydrophilic repeating unit and the hydrophobic repeating unit of 1:0.5 to 1:10, specifically 1:1 to 1:5, and more specifically, 1:higher than 1.2 to 1:5. If the molar ratio of the hydrophobic repeating unit is less than 0.5, the water content may increase and the dimensional stability and durability may be deteriorated. If the molar ratio of the hydrophobic repeating unit is more than 10, the ion-conductivity performance may not be exhibited.

Since the first ion conducting material and the second ion conducting material are constituted by different repeating units, the molar ratios of the hydrophilic repeating unit and the hydrophobic repeating unit may be different from each other, and even when the first ion conducting material and the second ion conducting material are constituted by the same repeating units, the molar ratios of the hydrophilic repeating unit and the hydrophobic repeating unit may be different from each other. That is, the characteristics of the exhibition performance in the first ion conducting material and the second ion conducting material may be differently adjusted by varying the molar ratios of the hydrophilic repeating unit and the hydrophobic repeating unit from each other.

At this time, the first ion conducting material may be an ion conducting material having a molar ratio of the hydrophilic repeating unit to the hydrophobic repeating unit which is higher than the molar ratio of the hydrophilic repeating unit to the hydrophobic repeating unit of the second ion conducting material.

Specifically, the molar ratio of the hydrophilic repeating unit and the hydrophobic repeating unit in the first ion conducting material may be 1:2 to 1:5, specifically 1:2 to 1:3, and the molar ratio of the hydrophilic repeating unit and the hydrophobic repeating unit in the second ion conducting material may be 1:3 to 1:6, specifically 1:3 to 1:4. At that time, even if the ranges of the molar ratio of the hydrophilic repeating unit to the hydrophobic repeating unit in the first ion conducting material and the second ion are overlapped, the molar ratio of the hydrophilic repeating unit to the hydrophobic repeating unit in the first ion conducting material may be higher than that in the second ion conducting material.

That is, when an ion exchanging membrane is manufactured using an ion conducting material having a relatively high molar ratio of the hydrophilic repeating unit like the first ion conducting material, there is an advantage of exhibiting high ion-conductivity efficiency and increasing voltage efficiency (V.E) of the energy storage system.

When the ion exchanging membrane is manufactured using the ion conducting material having a relatively high molar ratio of the hydrophobic repeating unit like the second ion conducting material, the morphological stability and durability of the ion exchanging membrane itself may be ensured while a swelling ratio of the ion exchanging membrane is reduced. In addition, when a hydrophilic channel is formed to be relatively small to be applied to a redox flow battery, the crossover of vanadium ions may be reduced to improve the current efficiency (C.E).

Therefore, by introducing the first ion conducting material having a relatively high molar ratio of the hydrophilic repeating unit into one surface of the porous support, the ion-conductivity performance is increased and the membrane resistance is reduced, thereby improving the performance efficiency of the energy storage system. In addition, by introducing the second ion conducting material having a relatively high molar ratio of the hydrophobic repeating unit into the other surface of the porous support, the morphological stability of the ion exchanging membrane is ensured and the crossover of the vanadium ions is reduced, thereby ensuring the durability of the ion exchanging membrane.

Meanwhile, the first ion conducting material located on one surface of the porous support and the second ion conducting material located on the other surface of the porous support may be present specifically, in a form of a first ion conducting layer located on one surface of the porous support and a second ion conducting layer located on the other surface of the porous support.

In this case, the pores of the porous support may be filled with any one selected from the group consisting of the first ion conducting material, the second ion conducting material, and a combination thereof. That is, the pores of the porous support may be filled only with the first ion conducting material and may be filled with only the second ion conducting material, and the pores on one surface of the porous support formed with the first ion conducting layer may be filled with the first ion conducting material and the pores on the other surface of the porous support formed with the second ion conducting layer may also be filled with the second ion conducting material.

FIG. 1 is a cross-sectional view schematically showing an example of the ion exchanging membrane 1.

Referring to FIG. 1, the first ion conducting material 20 is filled in the pores on one surface of the porous support 10, and the second ion conducting material 30 is filled in the pores on the other surface of the porous support 10.

The ion exchanging membrane 1 may further include the first ion conducting layer 21 and the second ion conducting layer 31 located on one surface and the other surface of the porous support 10, respectively. The first ion conducting layer 21 and the second ion conducting layer 31 may be formed by forming a thin membrane on the surface of the porous support 10 with the ion conducting material remaining after the first ion conducting material 20 and the second ion conducting material 30 are filled in the pores of the porous support 10.

The thickness ratio of the first ion conducting layer 21 may be 10 to 200 length % and specifically 50 to 100 length % with respect to the total thickness of the porous support, and the thickness ratio of the second ion conducting layer 31 may be 10 to 200 length % and specifically 50 to 100 length % with respect to the total thickness of the porous support. If the thickness ratios of the first ion conducting layer 21 and the second ion conducting layer 31 are less than 10 length %, the ion-conductivity performance may not be exhibited, and if the thickness ratios thereof are more than 200 length %, the porous support does not serve as a support and the durability may be reduced similarly to a single membrane. The thickness ratio of the ion conducting layer on one surface may be calculated by the following Equation 2.

Thickness ratio of ion conducting layer on one surface (length %)=(thickness of ion conducting layer on one surface/thickness of porous support)×100  [Equation 2]

When considering the effect obtained by introducing the first ion conducting material 20 and the second ion conducting material 30, the thickness ratio of the first ion conducting material 20 and the second ion conducting material 30 may be 9:1 to 1:9, specifically 9:1 to 6:4, and more specifically 8:2 to 6:4 with respect to the total thickness of the ion exchanging membrane 1.

That is, in order to obtain the morphological stability of the ion exchanging membrane 1 while improving the ion-conductivity performance of the ion exchanging membrane 1, it is advantageous that the thickness of the first ion conducting material 20, which has a relatively high molar ratio of the hydrophilic repeating unit, is larger than the thickness of the second ion conducting material 30.

Here, the thickness of the first ion conducting material 20 is obtained by the sum of the thickness of the first ion conducting material 20 impregnated into the internal pores of the porous support 10 and the thickness of the first ion conducting layer 21. Similarly, the thickness of the second ion conducting material 30 is obtained by the sum of the thickness of the second ion conducting material 30 impregnated into the internal pores of the porous support 10 and the thickness of the second ion conducting layer 31.

When considering the effect obtained by introducing the first ion conducting material 20 and the second ion conducting material 30, the first ion conducting material 20 is filled in all the pores of the porous support 10, the first ion conducting layer 21 may be formed on one surface of the porous support 10, and the second ion conducting layer 31 may be formed on the other surface of the porous support 10.

The ion exchanging membrane 1 may be formed by stacking a plurality of porous supports 10 including the first ion conducting material 20 and the second ion conducting material 30.

Figure 2:
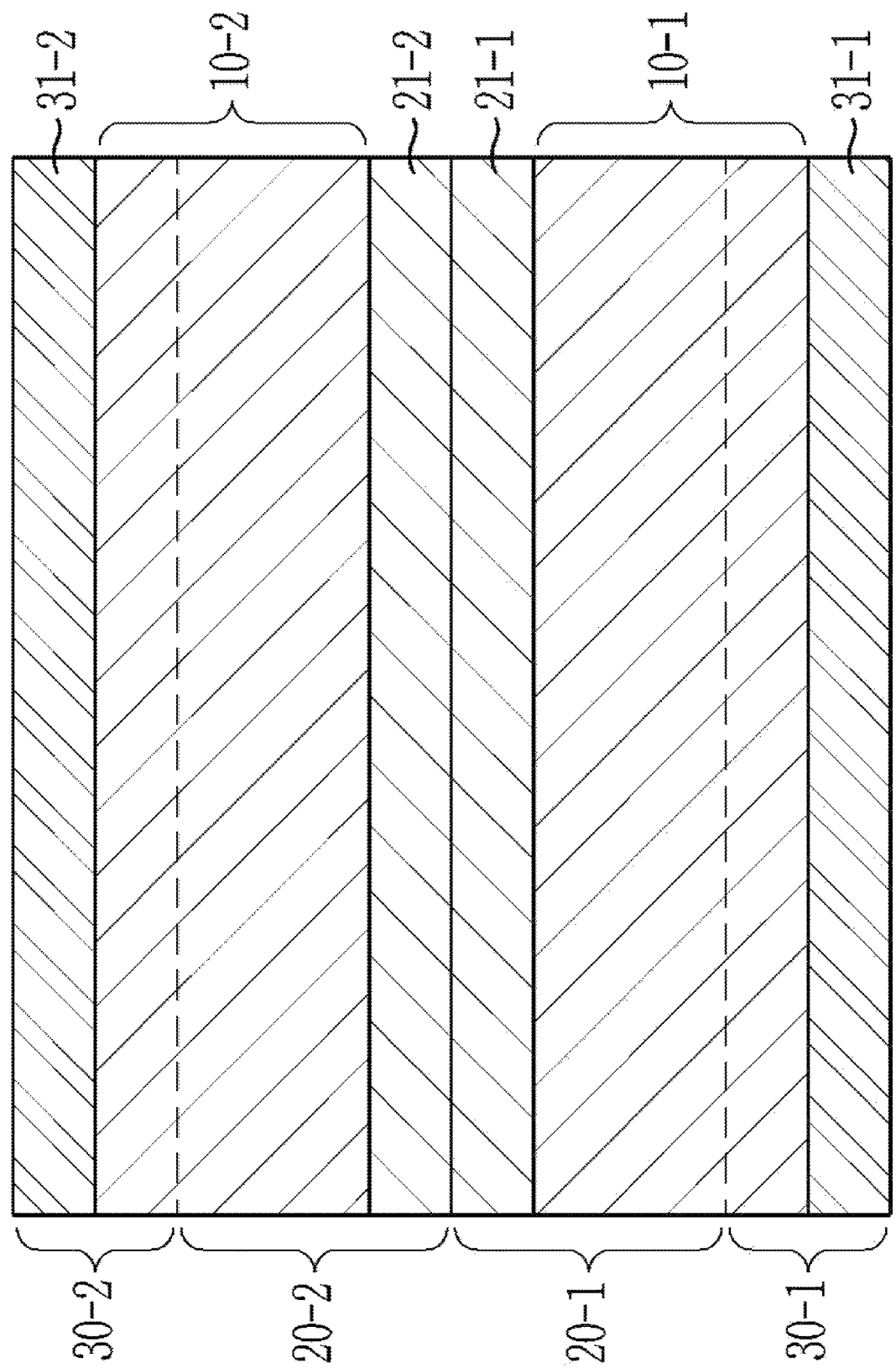
FIGS. 2 and 3 are cross-sectional views schematically showing an ion exchanging membrane in which a plurality of ion exchanging membranes shown in FIG. 1 is stacked.
Figure 3:
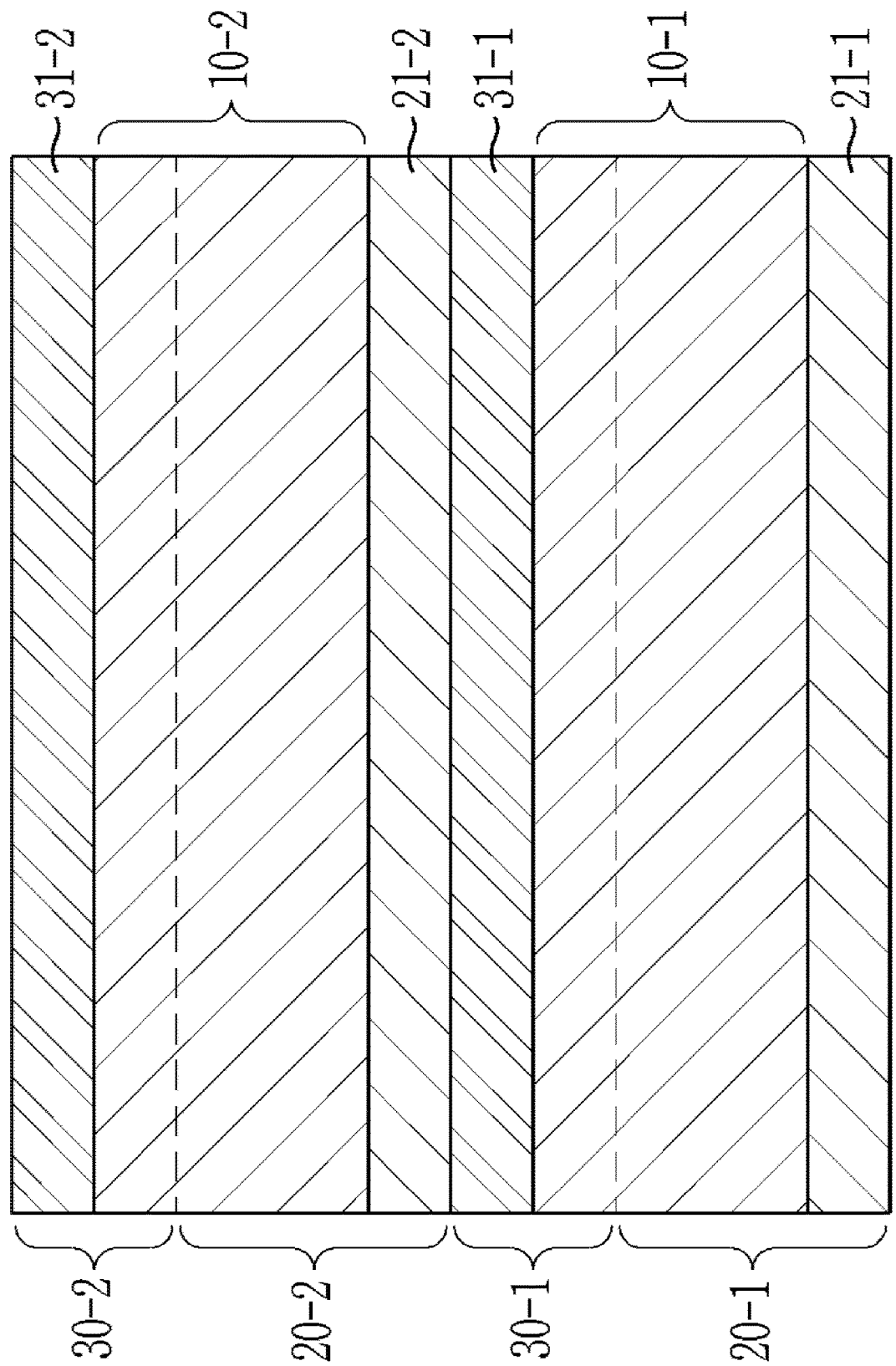

FIGS. 2 and 3 are cross-sectional views schematically showing the ion exchanging membrane 1 in which the plurality of porous supports 10 are stacked.

Referring to FIGS. 2 and 3, the ion exchanging membrane 1 may be configured by stacking a first ion conducting material 20-1 or a second ion conducting material 30-1 of a first porous support 10-1 to face a first ion conducting material 20-2 or a second ion conducting material 30-2 of a second porous support 10-2. Specifically, in FIG. 2, it is illustrated that the first ion conducting material 20-1 of the first porous support 10-1 is stacked to face the first ion conducting material 20-2 of the second porous support 10-2, and in FIG. 3, it is illustrated that the second ion conducting material 30-1 of the first porous support 10-1 is stacked to face the first ion conducting material 20-2 of the second porous support 10-2.

A method for manufacturing an ion exchanging membrane according to another embodiment of the present invention includes preparing a porous support including a plurality of pores, forming a first ion conducting material on one surface of the porous support, and forming a second ion conducting material on the other surface of the porous support.

First, the porous support including the plurality of pores, the first ion conducting material and the second ion conducting material are prepared.

At that time, the first ion conducting material and the second ion conducting material are polymers including hydrophilic repeating units and hydrophobic repeating units, and the first ion conducting material and the second ion conducting material may have different molar ratios of the hydrophilic repeating units to the hydrophobic repeating units. Since the description for the porous support, the first ion conducting material and the second ion conducting material is the same as described above, a repeated description will be omitted.

Next, the first ion conducting material is formed on one surface of the porous support, and the second ion conducting material is formed on the other surface of the porous support to manufacture an ion exchanging membrane in the form of a reinforced composite membrane.

Specifically, the first ion conducting material is filled in the pores on one surface of the porous support, and the first ion conducting material remaining after filling the pores on one surface of the porous support forms a first ion conducting layer on one surface of the porous support. In addition, the second ion conducting material is filled in the pores on the other surface of the porous support, and the second ion conducting material remaining after filling the pores on the other surface of the porous support forms a second ion conducting layer on the other surface of the porous support.

However, the present invention is not limited thereto, and the pores of the porous support may be filled only with the first ion conducting material, the first ion conducting layer is formed, and then only the second ion conducting layer may be formed on the other surface of the porous support with the second ion conducting material, and vice versa.

The filling of the pores of the porous support with the first ion conducting material and the second ion conducting material may be generally performed by carrying or impregnating the porous support in a solution containing the first ion conducting material or the second ion conducting material. In addition, the filing of the pores of the porous support with the first ion conducting material and the second ion conducting material may also be performed by any one method selected from the group consisting of bar coating, comma coating, slot die, screen printing, spray coating, doctor blading, laminating and combinations thereof.

That is, the method of manufacturing the ion exchanging membrane may use the existing process as it is, except that the first ion conducting material and the second ion conducting material are filled in one surface and the other surface of the porous support, respectively.

The first ion conducting material and the second ion conducting material may be filled in the porous support in the form of a solution or dispersion containing the first ion conducting material and the second ion conducting material. The solution or dispersion containing the first ion conducting material or the second ion conducting material may be used by purchasing a commercially available ion conducting material solution or dispersion and may also be prepared by dispersing the first ion conducting material or the second ion conducting material in a solvent. Since the method of dispersing the first ion conducting material or the second ion conducting material in the solvent may be performed by generally known methods in the related art, a detailed description thereof will be omitted.

As the solvent for preparing the solution or dispersion containing the first ion conducting material or the second ion conducting material, a solvent selected from the group consisting of water, a hydrophilic solvent, an organic solvent, and a mixture of at least one thereof may be used.

The hydrophilic solvent may have at least one functional group selected from the group consisting of alcohol, isopropyl alcohol, ketone, aldehyde, carbonate, carboxylate, carboxylic acid, ether and amide which contain straight or branched saturated or unsaturated hydrocarbons having 1 to 12 carbon atoms as a main chain, which may contain an alicyclic or aromatic cyclic compound as at least a part of the main chain.

The organic solvent may be selected from N-methylpyrrolidone, dimethylsulfoxide, tetrahydrofuran, and mixtures thereof.

In addition, the filling of the pores of the porous support with the first ion conducting material or the second ion conducting material may be affected by various factors such as the temperature, the time, and the like. For example, the filling of the pores of the porous support with the first ion conducting material or the second ion conducting material may be affected by the thickness of the porous support, the concentration of the solution or dispersion containing the first ion conducting material or the second ion conducting material, the type of the solvent, and the like. However, the process may be performed at a temperature of 100° C. or lower at any point of the solvent, and more usually, may be performed at a temperature of from room temperature (20° C.) to 70° C. or lower for about 5 to 30 minutes. However, the temperature may not be equal to or higher than the melting point of the porous support.

Meanwhile, the method for manufacturing the ion exchanging membrane may further include preparing a plurality of porous supports including the first ion conducting material and the second ion conducting material, and stacking the plurality of porous supports.

A laminating method may be applied at the time of applying the plurality of porous supports, and an ion exchanging membrane having high efficiency may be manufactured while easily adjusting the thickness ratio required in the energy storage system by stacking the porous supports.

An energy storage system according to yet another embodiment of the present invention includes the ion exchanging membrane. Hereinafter, a case where the energy storage system is a redox flow battery or a fuel cell will be described in detail. However, the present invention is not limited thereto, and an ion exchanging membrane is also applicable to an energy storage system of a secondary battery type.

In one example of the energy storage system, since the ion exchanging membrane has low vanadium ion permeability by blocking vanadium ions due to a small ion channel, it is possible to solve a problem that a vanadium active material is crossovered when being applied to a vanadium redox flow battery to deteriorate the energy efficiency, thereby achieving high energy efficiency. As a result, the energy storage system may be a redox flow battery.

The redox flow battery may be charged and discharged by supplying a cathode electrolyte and an anode electrolyte to a battery cell including a cathode and an anode arranged to face each other, and the ion exchanging membrane disposed between the cathode and the anode.

The redox flow battery may include an all vanadium-based redox battery using a V(IV)/V(V) redox couple as the cathode electrolyte and a V(II)/V(III) redox couple as the anode electrolyte; a vanadium-based redox battery using a halogen redox couple as the cathode electrolyte and a V(II)/V(III) redox couple as the anode electrolyte; a polysulfide bromine redox battery using a halogen redox couple as the cathode electrolyte and a sulfide redox couple as the anode electrolyte; or a zinc-bromine (Zn—Br) redox battery using a halogen redox couple as the cathode electrolyte and a zinc (Zn) redox couple as the anode electrolyte, but in the present invention, the type of the redox flow battery is not limited.

Hereinafter, a case where the redox flow battery is an all vanadium-based redox battery will be described as an example. However, the redox flow battery of the present invention is not limited to the all vanadium-based redox battery.

Figure 4:
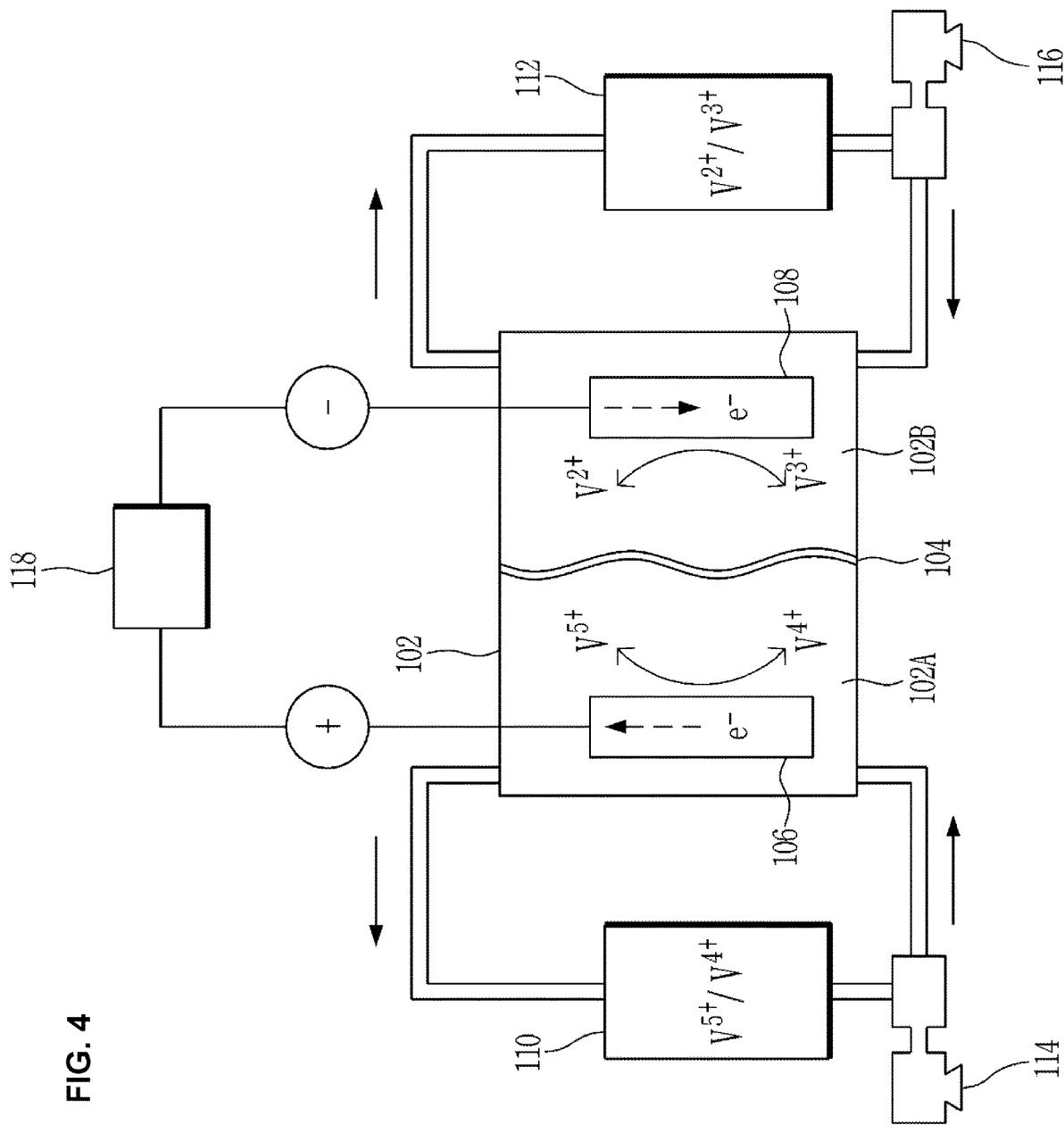
FIG. 4 is a schematic view schematically showing an all vanadium-based redox battery according to another embodiment of the present invention.

FIG. 4 is a schematic view showing the all vanadium-based redox battery.

Referring to FIG. 4, the redox flow battery includes a cell housing 102, an ion exchanging membrane 104 installed to divide the cell housing 102 into a cathode cell 102A and an anode cell 102B, and a cathode 106 and an anode 108 located in the cathode cell 102A and the anode cell 102B, respectively.

In addition, the redox flow battery may further include a cathode electrolyte storage tank 110 storing the cathode electrolyte and an anode electrolyte storage tank 112 storing the anode electrolyte.

The redox flow battery includes a cathode electrolyte inlet and a cathode electrolyte outlet at the upper and lower ends of the cathode cell 102A and may include an anode electrolyte inlet and an anode electrolyte outlet at the upper and lower ends of the anode cell 102B.

The cathode electrolyte stored in the cathode electrolyte storage tank 110 is introduced into the cathode cell 102A through the cathode electrolyte inlet by a pump 114 and then discharged from the cathode cell 102A through the cathode electrolyte outlet.

Similarly, the anode electrolyte stored in the anode electrolyte storage tank 112 is introduced into the anode cell 102B through the anode electrolyte inlet by a pump 116, and then discharged from the anode cell 102B through the anode electrolyte outlet.

In the cathode cell 102A, electrons move through the cathode 106 according to the operation of a power source/load 118 to cause the oxidation/reduction reaction of $V^{5+} \leftrightarrow V^{4+}$. Similarly, in the anode cell 102B, electrons move through the anode 108 according to the operation of the power source/load 118 to cause the oxidation/reduction reaction of $V^{2+} \leftrightarrow V^{3+}$. After the oxidation/reduction reaction, the cathode electrolyte and anode electrolyte are circulated to the cathode electrolyte storage tank 110 and the anode electrolyte storage tank 112, respectively.

The cathode 106 and the anode 108 may be formed of any one selected from the group consisting of at least one metal selected from Ru, Ti, Ir, Mn, Pd, Au, and Pt, an oxide of at least one metal selected from Ru, Ti, Ir, Mn, Pd, Au, and Pt (for example, applying an Ir oxide or Ru oxide on a Ti substrate), a carbon composite containing the composite material, a dimensionally stable electrode (DSE) including the composite material, a conductive polymer (for example, an electrically conductive polymer material such as polyacetylene or polythiophene), graphite, glassy carbon, conductive diamond, conductive diamond-like carbon (DLC), a nonwoven fabric made of carbon fibers, and a woven fabric made of carbon fibers.

The cathode electrolyte and the anode electrolyte may include any one metal ion selected from the group consisting of titanium ions, vanadium ions, chromium ions, zinc ions, tin ions, and mixtures thereof.

For example, the anode electrolyte contains vanadium divalent ions ($V^{2+}$) or vanadium trivalent ions ($V^{3+}$) as anode electrolyte ions, and the cathode electrolyte may contain vanadium tetravalent ions ($V^{4+}$) or vanadium pentavalent ions ($V^{5+}$) as cathode electrolyte ions.

The concentration of the metal ions contained in the cathode electrolyte and the anode electrolyte is preferably 0.3 to 5 M.

As the solvent of the cathode electrolyte and the anode electrolyte, any one selected from the group consisting of $H_2SO_4$, $K_2SO_4$, $Na_2SO_4$, $H_3PO_4$, $H_4P_2O_7$, $K_2PO_4$, $Na_3PO_4$, $K_3PO_4$, $HNO_3$, $KNO_3$ and $NaNO_3$ may be used. Since the metal ions which become the cathode and anode active materials are all water-soluble, an aqueous solution may suitably be used as the solvent of the cathode electrolyte and the anode electrolyte. Particularly, when any one selected from the group consisting of sulfuric acid, phosphoric acid, nitric acid, sulfate, phosphate and nitrate is used as the aqueous solution, stability, reactivity and solubility of the metal ions may be improved.

Meanwhile, the ion exchanging membrane may also be applied to a membrane-electrode assembly for a fuel cell. Specifically, the membrane-electrode assembly may include an anode electrode and a cathode electrode facing each other, and the ion exchanging membrane disposed between the anode electrode and the cathode electrode.

MODE FOR INVENTION

Hereinafter, Examples of the present invention will be described in detail so as to easily implement those skilled in the art. However, the present invention may be embodied in many different forms and are limited to Examples described herein.

Preparation Example 1: Manufacture of Ion Conducting Material

Preparation Example 1-1

1) Manufacture of Hydrophobic Repeating Unit

Like the following Reaction Formula 3, bisphenol A and 1,3-bis(4-chlorobenzoyol)benzene were reacted in the presence of potassium carbonate using a DMAc/Toluene co-solvent at 160 to 180° C. for 30 hours, ejected and washed with purified water, and then dried with hot air. At this time, a carother's equation was used to adjust the degree of polymerization of oligomers.

[Reaction Formula 3]

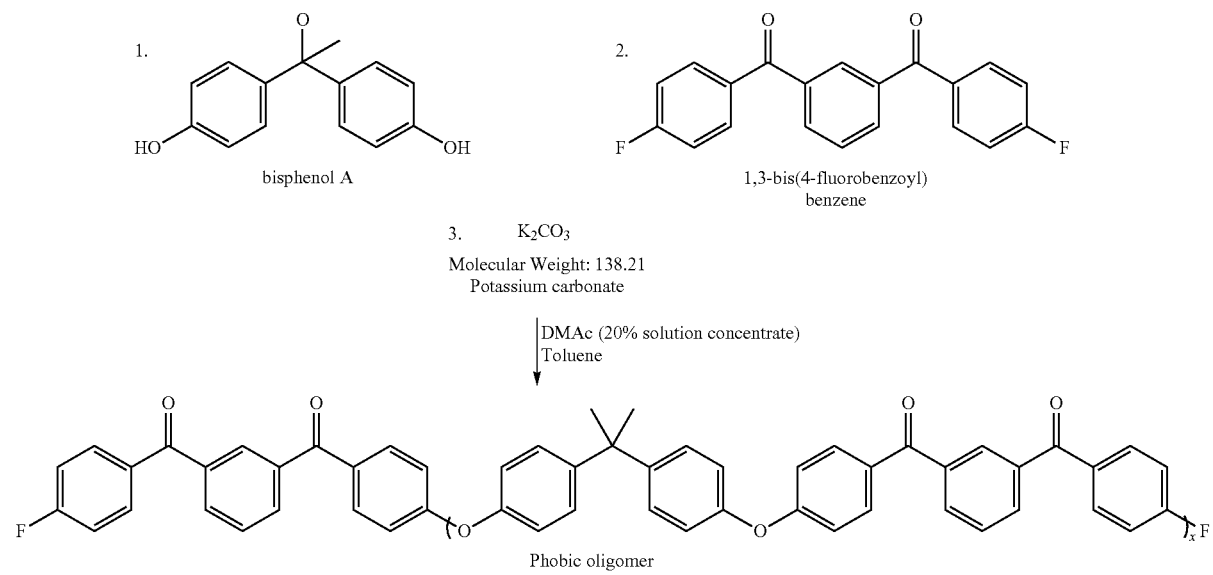

2) Manufacture of Hydrophilic Repeating Unit

Like the following Reaction Formula 4, 4,4'-(9-fluorenyliene)diphenol and bis(4-fluorophenyl)sulfone were reacted in the presence of potassium carbonate using a DMAc/Toluene co-solvent at 160 to 180° C. for 30 hours, ejected and washed with purified water, and then dried with hot air. At this time, a carother's equation was used to adjust the degree of polymerization of oligomers.

solution was discarded and the precipitated solid was washed with the purified water and then dried with hot air.

Preparation Example 1-2

An ion conducting material was prepared in the same manner as Preparation Example 1-1 above, except that the polymer was prepared to have a molar ratio of the hydro-

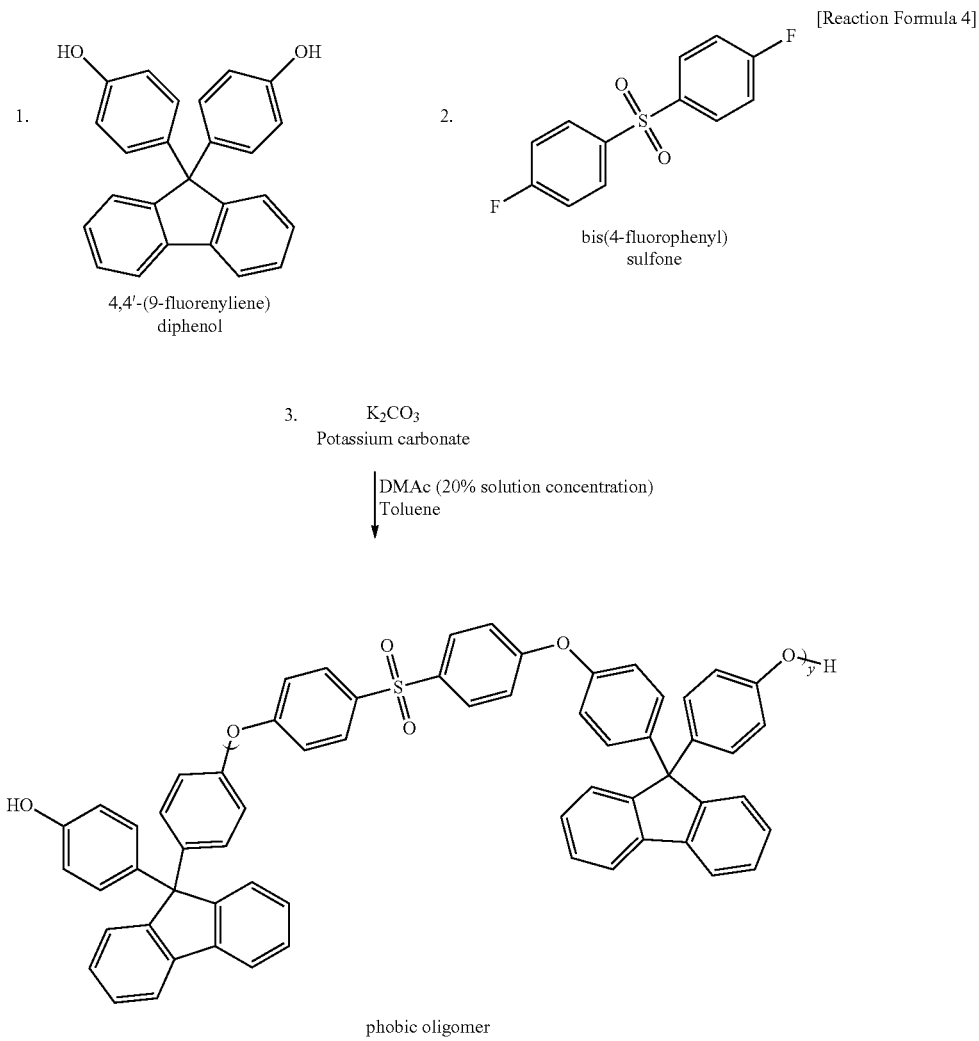

3) Manufacture of Polymer

The prepared hydrophilic repeating unit and hydrophobic repeating unit were reacted in the presence of potassium carbonate using a DMAc/Toluene co-solvent at 160 to 180° C. for 30 hours, ejected and washed with purified water, and then dried with hot air. A molar ratio of the hydrophilic repeating unit:the hydrophobic repeating unit of the prepared polymer was 1:3.5.

4) Manufacture of Ion Conducting Material

The prepared polymer was dissolved in dichloromethane, and slowly added to a 5-fold excess amount of chlorosulfonic acid/DCM solution and then stirred for 24 hours. The philic repeating unit:the hydrophobic repeating unit of 1:2.5 when the polymer was prepared in Preparation Example 1-1 above.

Preparation Example 1-3

1) Manufacture of Hydrophobic Repeating Unit

Like the following Reaction Formula 5, 4,4'-dihydroxybenzophenone and 2,6-difluorobenzonitrile were reacted in the presence of potassium carbonate using a DMAc/Toluene co-solvent at 160 to 180° C. for 30 hours, ejected and washed with purified water, and then dried with hot air. At this time, a carother's equation was used to adjust the degree of polymerization of oligomers.

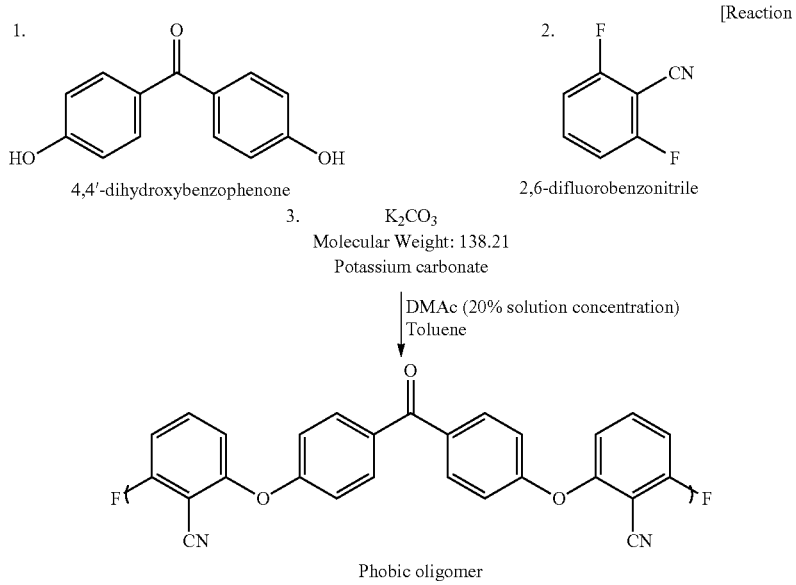

25

2) Manufacture of Hydrophilic Repeating Unit

Like the following Reaction Formula 6, 4,4'-(9-fluorenyliene)diphenol and bis(4-fluorophenyl)sulfone were reacted in the presence of potassium carbonate using a DMAc/Toluene co-solvent at 160 to 180° C. for 30 hours, ejected and washed with purified water, and then dried with hot air. At this time, a carother's equation was used to adjust the degree of polymerization of oligomers.

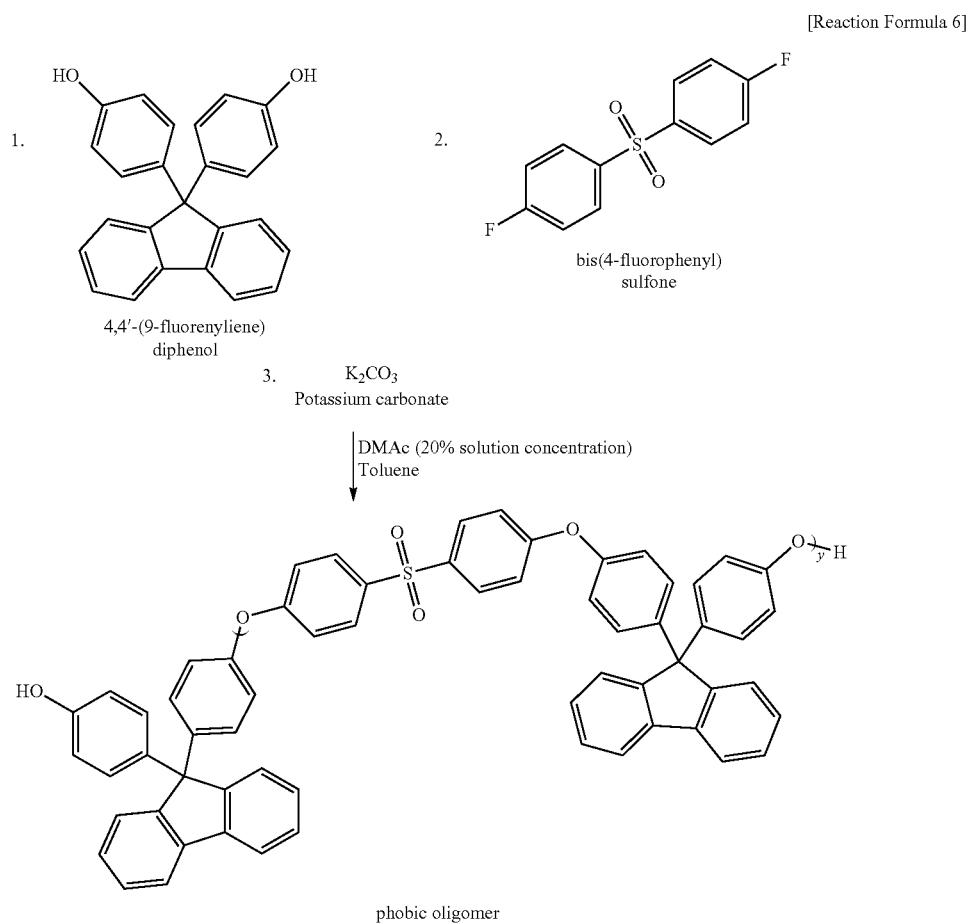

3) Manufacture of Polymer

The prepared hydrophilic repeating unit and hydrophobic repeating unit were reacted in the presence of potassium carbonate using a DMAc/Toluene co-solvent at 160 to 180° C. for 30 hours, ejected and washed with purified water, and then dried with hot air. A molar ratio of the hydrophilic repeating unit (Y):the hydrophobic repeating unit (X) of the prepared polymer was 1:3.5.

4) Manufacture of Ion Conducting Material

The prepared polymer was dissolved in dichloromethane, and slowly added to a 5-fold excess amount of chlorosulfonic acid/DCM solution and then stirred for 24 hours. The C. for 30 hours, ejected and washed with purified water, and then dried with hot air. At this time, a carother's equation was used to adjust the degree of polymerization of oligomers.

3) Manufacture of Polymer

The prepared hydrophilic repeating unit and hydrophobic repeating unit were reacted in the presence of potassium carbonate using a DMAc/Toluene co-solvent at 160 to 180° C. for 30 hours, ejected and washed with purified water, and then dried with hot air to prepare a polymer represented by the following Chemical Formula 7. A molar ratio of the hydrophilic repeating unit (Y):the hydrophobic repeating unit (X) of the prepared polymer was 1:3.5.

[Chemical Formula 7]

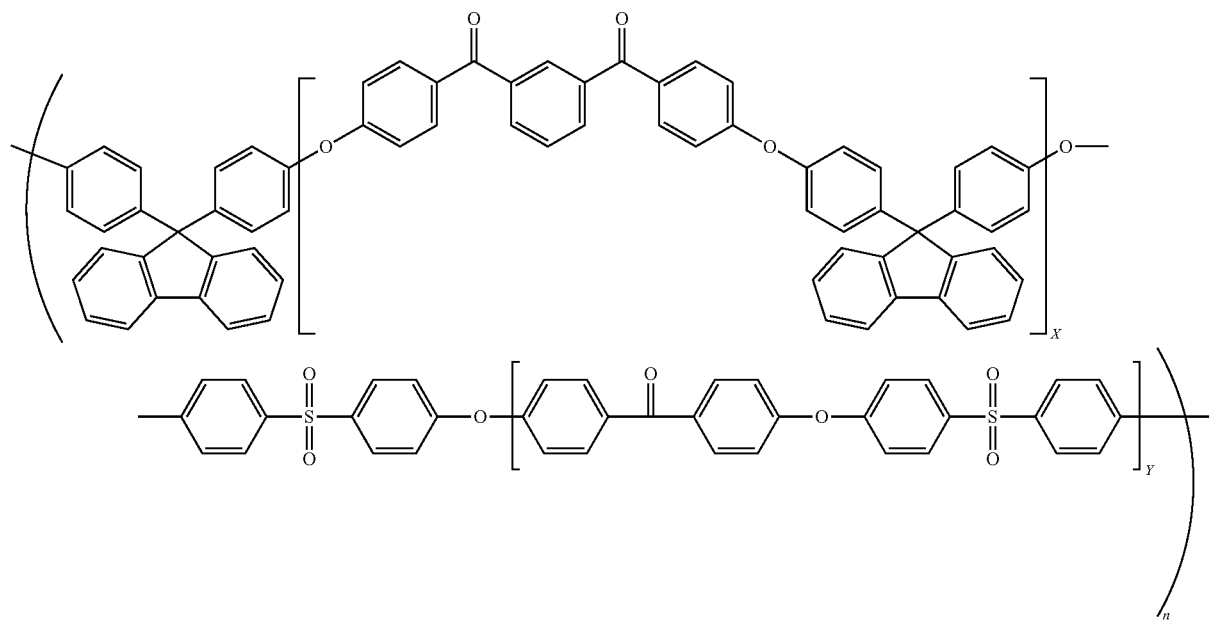

solution was discarded and the precipitated solid was washed with the purified water and then dried with hot air.

Preparation Example 1-4

An ion conducting material was prepared in the same manner as Preparation Example 1-3 above, except that the polymer was prepared to have a molar ratio of the hydrophilic repeating unit:the hydrophobic repeating unit of 1:2.5 when the polymer was prepared in Preparation Example 1-3 above.

Preparation Example 1-5

1) Manufacture of Hydrophobic Repeating Unit 4,4'-dihydroxybenzophenone and bis(4-fluorophenyl)sulfone were reacted in the presence of potassium carbonate using a DMAc/Toluene co-solvent at 160 to 180° C. for 30 hours, ejected and washed with purified water, and then dried with hot air. At this time, a carother's equation was used to adjust the degree of polymerization of oligomers.

2) Manufacture of Hydrophilic Repeating Unit 4,4'-(9-fluorenyliene)diphenol and 1,3-bis(4-fluorobenzoyol)benzene were reacted in the presence of potassium carbonate using a DMAc/Toluene co-solvent at 160 to 180°

4) Manufacture of Ion Conducting Material

The prepared polymer was dissolved in dichloromethane, and slowly added to a 5-fold excess amount of chlorosulfonic acid/DCM solution and then stirred for 24 hours. The solution was discarded and the precipitated solid was washed with the purified water and then dried with hot air.

Preparation Example 1-6

An ion conducting material was prepared in the same manner as Preparation Example 1-5 above, except that the polymer was prepared to have a molar ratio of the hydrophilic repeating unit:the hydrophobic repeating unit of 1:2.5 when the polymer was prepared in Preparation Example 1-5 above.

Preparation Example 2: Manufacture of Porous Support

Preparation Example 2-1

Polyamic acid was dissolved in dimethylformamide to prepare 5 L of a spinning solution of 480 poise. The prepared spinning solution was transferred to a solution tank and supplied and spinned to a spinning chamber having 20 nozzles and a high voltage applied to 3 kV through a metering gear pump to prepare a nanofiber precursor web. At this time, the solution supply amount was 1.5 ml/min. The prepared nanofiber precursor web was heat-treated at 350° C. to prepare a porous support (porosity: 40 vol %).

The weight per unit area of a polyimide nanofiber in the porous support was 6.8 gsm.

Example 1: Manufacture of Ion Exchanging Membrane

Example 1-1

The ion conducting material prepared in Preparation Example 1-1 having the molar ratio of the hydrophilic repeating unit:hydrophobic repeating unit of 1:3.5 and the ion conducting material prepared in Preparation Example 1-2 having the molar ratio of the hydrophilic repeating unit:hydrophobic repeating unit of 1:2.5 were dissolved in a DMAc in an amount of 20 wt %, respectively, to prepare an ion conducting material solution.

Next, an ion exchanging membrane was prepared by impregnating the ion conducting material solutions prepared in Preparation Example 1-1 and Preparation Example 1-2 into one surface and the other surface of the porous support prepared in Preparation Example 2-1, respectively.

Specifically, in the impregnation method, first, the ion conducting material prepared in Preparation Example 1-2 having a relatively high molar ratio of the hydrophilic repeating unit was impregnated into one surface of the porous support to be filled in the pores on one surface of the porous support, and then the first ion conducting layer was formed on one surface of the porous support. Thereafter, the ion conducting material prepared in Preparation Example 1-1 having a relatively high molar ratio of the hydrophobic repeating unit was impregnated into the other surface of the porous support to be filled in the pores on the other surface of the porous support, and then the second ion conducting layer was formed on the other surface of the porous support.

Each surface was impregnated for 30 minutes, then left under reduced pressure for 1 hour and dried in a vacuum of 80° C. for 10 hours to manufacture an ion exchanging membrane.

At this time, the weight of the ion conducting material was 65 mg/cm$^2$. With respect to the entire ion exchanging membrane prepared, the thickness ratio of the first ion conducting material prepared in Preparation Example 1-2 having a relatively high molar ratio of the hydrophilic repeating unit was 70%, and the thickness ratio of the second ion conducting material prepared in Preparation Example 1-1 having a relatively high molar ratio of the hydrophobic repeating unit was 30%. At this time, the thickness ratio is a sum of the thickness impregnated into the porous support and the thickness of the ion conducting layer formed on the surface of the porous support.

Examples 1-2 and 1-3

Except for using the ion conducting materials prepared in Preparation Examples 1-3 and 1-4, and the ion conducting materials prepared in Preparation Examples 1-5 and 1-6 instead of the ion conducting materials prepared in Preparation Examples 1-1 and 1-2 in Example 1-1, an ion exchanging membrane was manufactured in the same manner as Example 1-1.

Comparative Example 1-1

The porous support prepared in Preparation Example 2-1 was impregnated into an ion conducting material solution prepared by dissolving the ion conducting material prepared in Preparation Example 1-1 in a DMAc in an amount of 20 wt % twice for 30 minutes, and then left under reduced pressure for 1 hour, and dried in a vacuum of 80° C. for 10 hours to manufacture an ion exchanging membrane. At this time, the weight of the ion conducting material was 65 mg/cm$^2$.

Comparative Example 1-2

The porous support prepared in Preparation Example 2-1 was impregnated into an ion conducting material solution prepared by dissolving the ion conducting material prepared in Preparation Example 1-2 in a DMAc in an amount of 20 wt % twice for 30 minutes, and then left under reduced pressure for 1 hour, and dried in a vacuum of 80° C. for 10 hours to manufacture an ion exchanging membrane. At this time, the weight of the ion conducting material was 65 mg/cm$^2$.

Experimental Example 1: Measurement of Characteristics of Prepared Ion Conducting Material Ion exchange capacity (IEC) of the ion exchanging membranes manufactured in Comparative Examples 1-1 and 1-2 was evaluated by neutralization titration. The ion-conductivity and the dimensional stability were measured under a condition of 80° C. and 95% relative humidity and a condition of 80° C. and 50% relative humidity, respectively. The results were shown in Table 1 below.

Figure 5:
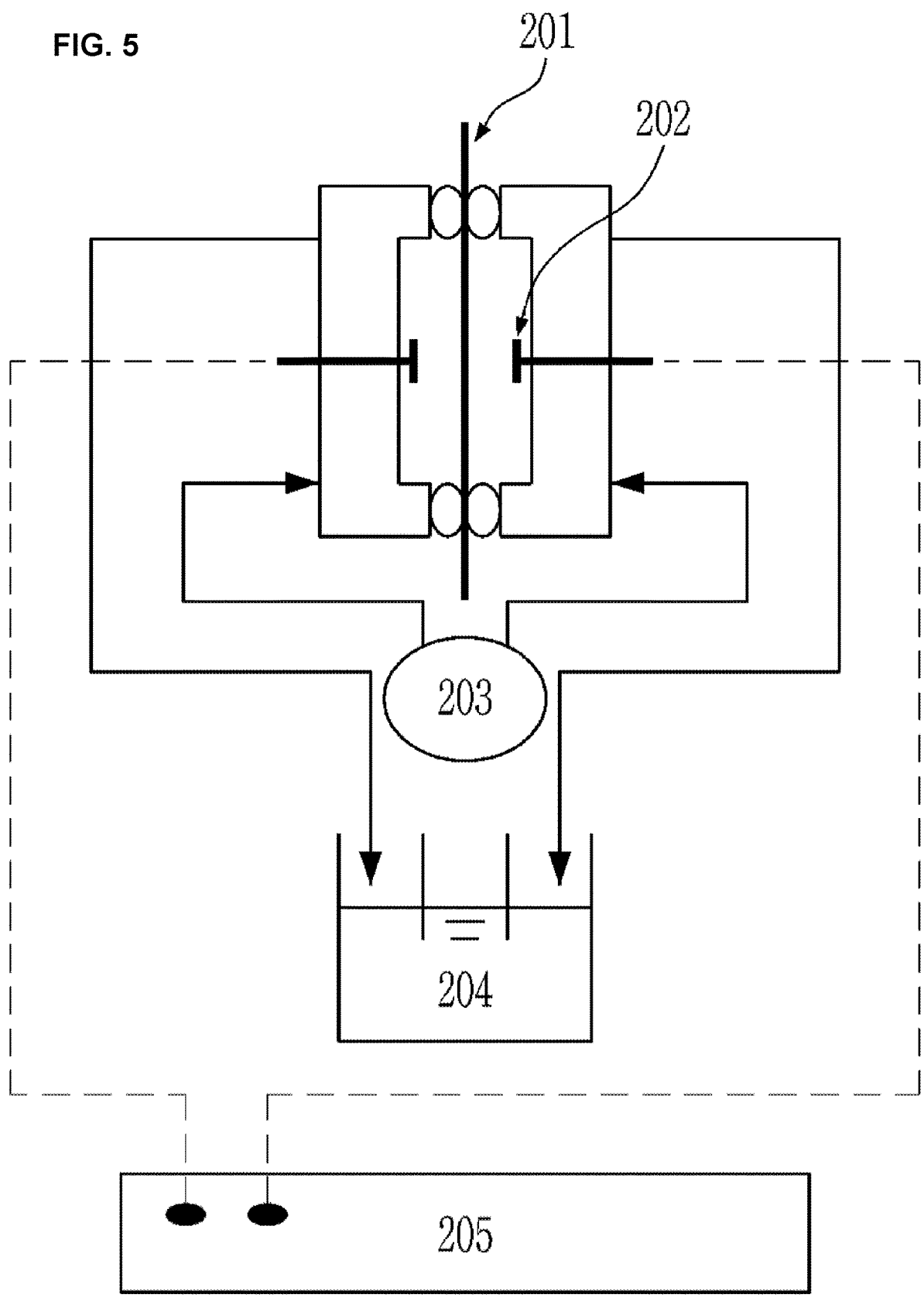
FIG. 5 is a schematic view showing a device used for measuring the resistance of a membrane in Experimental Example 1 of the present invention.

The ion-conductivity was calculated by measuring the membrane resistance in 1M $H_2SO_4$ using the equipment shown in FIG. 5 below.

The membrane resistance was calculated by the following Equation 3, and the effective area of the membrane was 0.75 cm$^2$.

$$\text{Membrane resistance } (R)=(R_1-R_2)\times(\text{effective area of membrane}) \quad \text{[Equation 3]}$$

Here, $R_1$ was a resistance [Ω] when the membrane was injected, and $R_2$ was a resistance [Ω] when the membrane was not injected.

The ion-conductivity was calculated by the following Equation 4.

$$\text{Ion-conductivity (S/cm)}=1/R\times t \quad \text{[Equation 4]}$$

Here, R was a membrane resistance [Ω·cm$^2$], and t was a membrane thickness [cm].

The dimensional stability was measured by measuring the thickness and area of the ion exchanging membrane after immersing the prepared ion exchanging membrane in distilled water at 80° C. for 24 hours and taking out the wet ion exchanging membrane, measuring the thickness and area of the ion exchanging membrane after drying the ion exchanging membrane in a vacuum state of 80° C. for 24 hours, and then measuring a swelling ratio to the thickness and a swelling ratio to the area by putting a thickness $T_{wet}$ and an area $L_{wet}$ in a wet state of the ion exchanging membrane and a thickness $T_{dry}$ and an area $L_{dry}$ in a dry state of the ion exchanging membrane into Equations 5 and 6 below.

$$(T_{wet}-T_{dry}/T_{dry})\times100=\Delta T(\text{swelling ratio to thickness, \%}) \quad \text{[Equation 5]}$$

$$(L_{wet}-L_{dry}/L_{dry})\times100=\Delta L(\text{swelling ratio to area, \%}) \quad \text{[Equation 6]}$$

TABLE 1

| | Molar ratio of hydrophilic repeating units:hydrophobic repeating units | Membrane thickness (μm) | IEC | Weight average molecular weight (Mw) | Water content (%) | Conductivity (S/cm) | | Dimensional stability (%) | |
|---|---|---|---|---|---|---|---|---|---|
| | | | | | | RH95% | RH50% | ΔL | ΔT |
| Comparative Example 1-1 | 1:3.5 | 22 to 23 | 1.65 | 150000 | 26 | 0.14 | 0.018 | 3.9 | 16 |
| Comparative Example 1-2 | 1:2.5 | 22 to 23 | 1.8 | 160000 | 30 | 0.17 | 0.019 | 3.9 | 20 |

As shown in Table 1 above, the ion exchanging membranes prepared in Comparative Examples 1-1 and 1-2 include an ion conducting material having a hydrocarbon-based block copolymer consisting of a hydrophilic repeating unit and a hydrophobic repeating unit to facilitate a structure change, and it is easy to control the characteristics of the block copolymer and the ion conducting material by controlling the structure of the hydrophilic repeating unit and the hydrophobic repeating unit.

When describing characteristics according to a control of a molar ratio of the hydrophilic repeating unit and the hydrophobic repeating unit of the ionic conducting material, it can be confirmed that the ion conducting material having a relatively high molar ratio of the hydrophilic repeating unit in which a molar ratio is 1:2.5 has ion exchange capacity or ion-conductivity performance superior to the ion conducting material having a relatively high molar ratio of the hydrophobic repeating unit in which a molar ratio is 1:3.5. These characteristics may contribute to increase the performance efficiency of the energy storage system. However, it is confirmed that from the viewpoint of water content, an ion conducting material having a relatively high molar ratio of the hydrophobic repeating unit is advantageous, and the dimensional stability is ensured and the morphological stability is excellent even at the same membrane thickness.

In particular, the swelling of the ion exchanging membrane is a factor that greatly affects the durability, and as the morphological stability is ensured, the durability of the ion exchanging membrane on the energy storage system increases, thereby promoting improvement of the durability of the entire energy storage system.

Experimental Example 2: Morphology Analysis of Prepared Ion Exchanging Membrane

Figure 6:
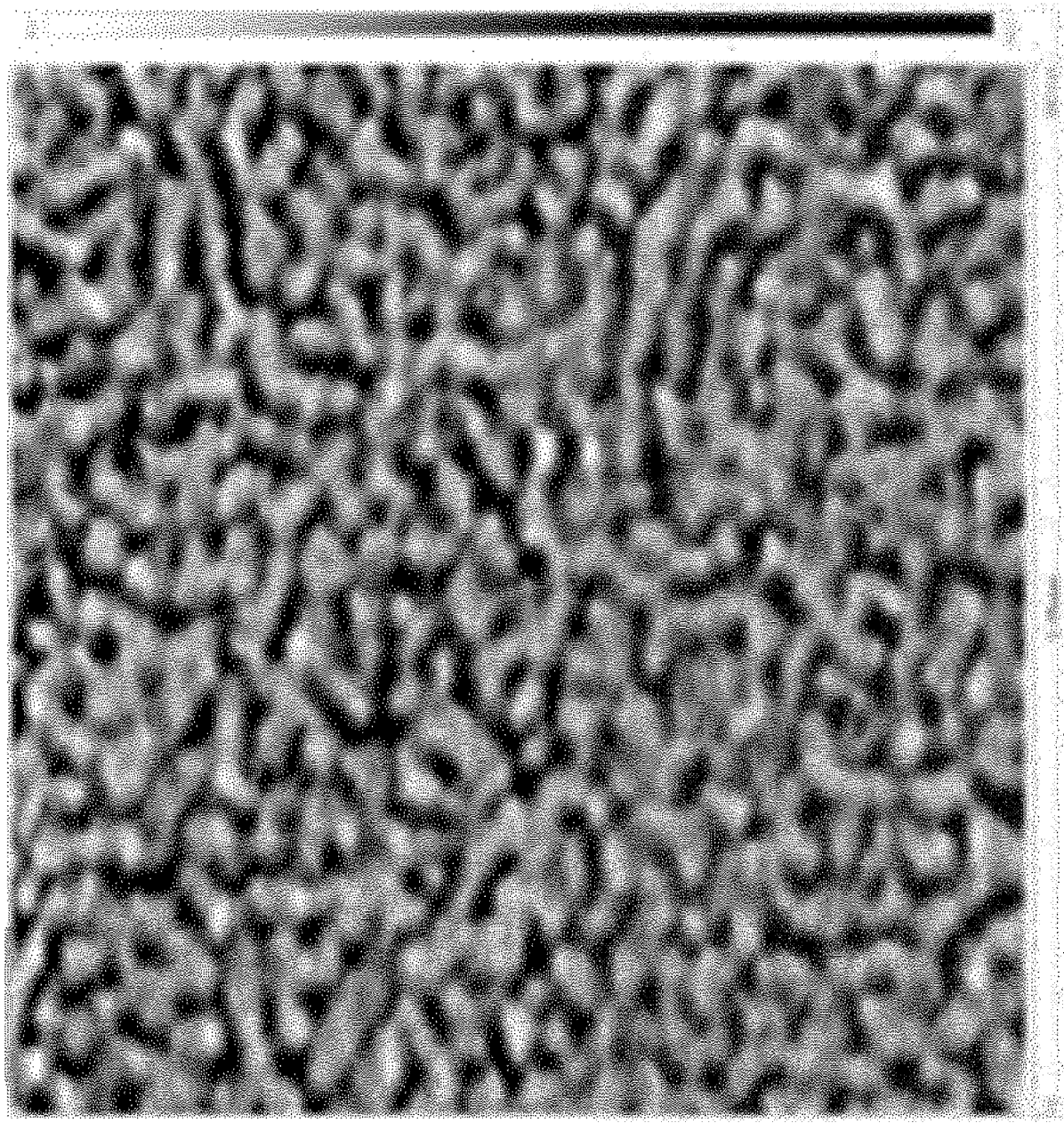

AFM images of one surface and the other surface of the ion exchanging membrane prepared in Example 1-1 were shown in FIGS. 6 and 7, respectively.

Specifically, FIG. 6 shows an AFM image of one surface impregnated with the ion conducting material prepared in Preparation Example 1-1 having a relatively high molar ratio of the hydrophobic repeating unit in which a molar ratio of the hydrophilic repeating unit:the hydrophobic repeating unit is 1:3.5, and FIG. 7 shows an AFM image of one surface impregnated with the ion conducting material prepared in Preparation Example 1-2 having a relatively high molar ratio of the hydrophilic repeating unit in which a molar ratio of the hydrophilic repeating unit:the hydrophobic repeating unit is 1:2.5.

Referring to FIGS. 6 and 7, the morphology of the ion conducting materials having different molar ratios of the hydrophilic repeating unit:the hydrophobic repeating unit may be observed, and as a result, it can be confirmed that it is possible to control the structure of the ion conducting material by controlling the molar ratio of the hydrophilic repeating unit:the hydrophobic repeating unit of the ion conducting material.

Specifically, when comparing ion channel formation of the ion conducting material having a relatively high molar ratio of the hydrophobic repeating unit in which a molar ratio of the hydrophilic repeating unit:the hydrophobic repeating unit is 1:3.5 and the ion conducting material having a relatively high molar ratio of the hydrophilic repeating unit in which a molar ratio of the hydrophilic repeating unit:the hydrophobic repeating unit is 1:2.5, it can be confirmed that an ion conductive channel size of the ion conducting material having a relatively high molar ratio of the hydrophobic repeating unit is relatively small. That is, it can be confirmed that in the ion conducting material having a relatively high molar ratio of the hydrophobic repeating unit, the hydrophilic channel size formed by phase separation of the hydrophilic repeating unit is formed to be smaller, and as a result, it can be seen that it is possible to more efficiently prevent the crossover of vanadium in a redox flow battery. This contributes to improve the overall energy efficiency (E.E) by improving the current efficiency (C.E) of the energy storage system.

Experimental Example 3: Performance Analysis of Prepared Ion Exchanging Membrane With respect to the ion exchanging membranes prepared in Example 1-1, Comparative Example 1-1 and Comparative Example 1-2, voltage efficiency, current efficiency and system efficiency were measured and the results were shown in Table 2 below.

The energy efficiency (EE) of the ion exchanging membrane constituted the following device, and the electrochemical characteristics were measured.

A device for measuring the energy efficiency was constituted by a unit cell having an electrode area of 25 $cm^2$, two aqueous solution tanks, and a pump in order to measure electrochemical characteristics in the VRFB. As a cathode solution, 30 mL of a solution (aqueous solution of tetravalent vanadium) containing 1.7 M $VOSO_4$ and 3 M $H_2SO_4$ was used, and as an anode solution, an aqueous solution (aqueous solution of trivalent vanadium) in which the cathode solution was electrolytically reduced was used. The amount of the cathode solution was slightly larger than that of the anode solution to suppress overcharge. The unit cell for measurement was constituted by a membrane to be measured, a heat-treated carbon felt having a size of 25 cm² (a product from Nippon Carbon Co., Ltd.), and a current collector. A constant potential/constant current meter was used for charge/discharge of the unit cell for measurement, and the charge/discharge current density was measured at 60 mA/cm². In addition, the charging/discharging of the unit cell was performed in a cut-off manner by setting a charging voltage to 1.6 V and a discharging voltage to 1.0 V, and performed five times, and then the current efficiency (CE), voltage efficiency (VE) and energy efficiency (EE) were calculated by using the following Equation 7.

$$CE = Q_D/Q_C$$

$$VE = E_{AD}/E_{AC}$$

$$EE = CE \times VE \quad \text{[Equation 7]}$$

Here, $Q_C[C]$ and $Q_D[C]$ are coulomb amounts at charging and discharging, and $E_{AC}[V]$ and $E_{AD}[V]$ are cell voltages at charging and discharging.

TABLE 2

| | Molar ratio of hydrophilic repeating units: hydrophobic repeating units | Membrane thickness (μm) | Voltage efficiency (V.E) | Current efficiency (C.E) | System efficiency (E.E) |
|---|---|---|---|---|---|
| Comparative Example 1-1 | 1:3.5 | 22 to 23 | 83.5% | 97% | 81% |
| Comparative Example 1-2 | 1:2.5 | 22 to 23 | 86% | 95% | 82% |
| Example 1-1 | 1:2.5 + 1:3.5[1)] | 22 to 23 | 87% | 97.5% | 84% |
| Nafion211 Commercial membrane | — | 25 | 87% | 94% | 82% |

1) The thickness ratio of the second ion conducting material prepared in Preparation Example 1-1 having a relatively high molar ratio of the hydrophobic repeating unit to the first ion conducting material prepared in Preparation Example 1-2 having a relatively high molar ratio of the hydrophilic repeating unit was 7:3. At this time, the thickness ratio is a sum of the thickness impregnated into the porous support and the thickness of the ion conducting layer formed on the surface of the porous support.

Referring to Table 2 above, it can be confirmed that in the case of the ion exchanging membrane manufactured in Example 1-1, the current efficiency shows the performance of the ion conducting material having a relatively high molar ratio of the hydrophilic repeating unit having relatively good ion-conductivity, and the voltage efficiency shows the performance of the ion conducting material having a relatively high molar ratio of the hydrophobic repeating unit having relatively good durability, and the system efficiency is improved as a whole compared with the ion exchanging membranes manufactured in Comparative Examples 1-1 and 1-2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims

EXPLANATION OF REFERENCE NUMERALS AND SYMBOLS

1: Ion exchanging membrane
10, 10-1, 10-2: Porous support
20, 20-1, 20-2: First ion conducting material
21, 21-1, 21-2: First ion conducting layer
30, 30-1, 30-2: Second ion conducting material
31, 31-1, 31-2: Second ion conducting layer
102: Cell housing
102A: Cathode cell
102b: Anode cell
104: Ion exchanging membrane
106: Cathode
108: Anode
110: Cathode electrolyte storage tank
112: Anode electrolyte storage tank
114,116: Pump
118: Power source/load
201: Ion exchanging membrane
202: Electrode
203: Pump
204: 1M $H_2SO_4$
205: LCR meter

INDUSTRIAL APPLICABILITY

The present invention relates to an ion exchanging membrane, a method for manufacturing the same, and an energy storage system comprising the same. According to the ion exchanging membrane, it is possible to improve overall efficiency of the energy storage system by improving both performance efficiency and voltage efficiency of the energy storage system due to excellent ion-conductivity performance and reduced membrane resistance and ensure durability of the energy storage system by having excellent morphological stability and reducing a crossover of vanadium ions.

The invention claimed is:
1. An ion exchanging membrane comprising: a porous support including a plurality of pores;
   a first ion conducting material located on one surface of the porous support; and
   a second ion conducting material located on the other surface of the porous support,
   wherein the first ion conducting material and the second ion conducting material are polymers including hydrophilic repeating units and hydrophobic repeating units,
   the first ion conducting material and the second ion conducting material have different molar ratios of the hydrophilic repeating units and the hydrophobic repeating units,
   the first ion conducting material has a molar ratio of the hydrophilic repeating unit to the hydrophobic repeating unit which is higher than the molar ratio of the hydrophilic repeating unit to the hydrophobic repeating unit of the second ion conducting material, and
   a thickness ratio of the first ion conducting material and the second ion conducting material is 9:1 to 6:4.
2. The ion exchanging membrane of claim 1, wherein the first ion conducting material and the second ion conducting material have each independently molar ratios of the hydrophilic repeating units and the hydrophobic repeating units of 1:0.5 to 1:10.

3. The ion exchanging membrane of claim 1, wherein the molar ratio of the hydrophilic repeating unit and the hydrophobic repeating unit in the first ion conducting material is 1:2 to 1:5, and the molar ratio of the hydrophilic repeating unit and the hydrophobic repeating unit in the second ion conducting material is 1:3 to 1:6.

4. The ion exchanging membrane of claim 1, wherein the first ion conducting material and the second ion conducting material are each independently hydrocarbon-based ion conducting materials, and the porous support is a hydrocarbon-based porous support.

5. The ion exchanging membrane of claim 1, wherein the first ion conducting material and the second ion conducting material are each independently filled in the pores of the porous support.

6. The ion exchanging membrane of claim 1, further comprising:
  a first ion conducting layer located on one surface of the porous support and a second ion conducting layer located on the other surface of the porous support,
  wherein the first ion conducting layer includes the first ion conducting material, and
  the second ion conducting layer includes the second ion conducting material.

7. The ion exchanging membrane of claim 6, wherein thicknesses of the first ion conducting layer and the second ion conducting layer are each independently 10 to 200 length % with respect to the total thickness of the porous support.

8. The ion exchanging membrane of claim 6, wherein the ion exchanging membrane includes a first ion conducting material filled in pores of the porous support, a first ion conducting layer located on one surface of the porous support, and a second ion conducting layer located on the other surface of the porous support.

9. The ion exchanging membrane of claim 1, wherein a plurality of porous supports including the first ion conducting material and the second ion conducting material is stacked.

10. The ion exchanging membrane of claim 9, wherein a first ion conducting material or a second ion conducting material of a first porous support is stacked to face a first ion conducting material or a second ion conducting material of a second porous support.

11. A method for manufacturing an ion exchanging membrane comprising:
  preparing a porous support including a plurality of pores;
  forming a first ion conducting material on one surface of the porous support; and
  forming a second ion conducting material on the other surface of the porous support,
  wherein the first ion conducting material and the second ion conducting material are polymers including hydrophilic repeating units and hydrophobic repeating units,
  the first ion conducting material and the second ion conducting material have different molar ratios of the hydrophilic repeating units and the hydrophobic repeating units,
  the first ion conducting material has a molar ratio of the hydrophilic repeating unit to the hydrophobic repeating unit which is higher than the molar ratio of the hydrophilic repeating unit to the hydrophobic repeating unit of the second ion conducting material, and
  a thickness ratio of the first ion conducting material and the second ion conducting material is 9:1 to 6:4.

12. The method for manufacturing the ion exchanging membrane of claim 11, further comprising:
  preparing a plurality of porous supports including the first ion conducting material and the second ion conducting material; and
  stacking the plurality of porous supports.

13. An energy storage system comprising the ion exchanging membrane according to claim 1.

14. The energy storage system of claim 13, wherein the energy storage system is a fuel cell.

15. The energy storage system of claim 13, wherein the energy storage system is a redox flow battery.

* * * * *